(12) United States Patent
Dotz et al.

(10) Patent No.: US 11,764,628 B2
(45) Date of Patent: Sep. 19, 2023

(54) STATOR WITH OFFSET PINS FOR AN ELECTRIC MACHINE

(71) Applicant: VALEO SIEMENS EAUTOMOTIVE GERMANY GMBH, Erlangen (DE)

(72) Inventors: Boris Dotz, Munich (DE); Christian Finger-Albert, Bad Kissingen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 170 days.

(21) Appl. No.: 17/123,490

(22) Filed: Dec. 16, 2020

(65) Prior Publication Data

US 2021/0194307 A1  Jun. 24, 2021

(30) Foreign Application Priority Data

Dec. 20, 2019 (DE) ..................... 10 2019 135 426.9

(51) Int. Cl.
  *H02K 3/12* (2006.01)
  *H02K 1/16* (2006.01)
  *H02K 3/28* (2006.01)
  *H02K 3/38* (2006.01)

(52) U.S. Cl.
  CPC ............. *H02K 3/12* (2013.01); *H02K 1/165* (2013.01); *H02K 3/28* (2013.01); *H02K 3/38* (2013.01); *H02K 2203/09* (2013.01)

(58) Field of Classification Search
  CPC ........ H02K 3/14; H02K 2213/03; H02K 1/16; H02K 15/02; H02K 15/062; H02K 3/12; H02K 1/165; H02K 3/28; H02K 3/38; H02K 2203/09
  USPC ................ 310/310, 179, 184, 197, 198, 201
  See application file for complete search history.

(56) References Cited

U.S. PATENT DOCUMENTS

| | | | | |
|---|---|---|---|---|
| 6,181,043 B1* | 1/2001 | Kusase | .................... | H02K 3/50 310/201 |
| 6,201,332 B1* | 3/2001 | Umeda | .................... | H02K 3/28 310/179 |
| 6,462,453 B1* | 10/2002 | Asao | ........................ | H02K 3/28 310/260 |

(Continued)

FOREIGN PATENT DOCUMENTS

| | | |
|---|---|---|
| DE | 10326095 A1 | 4/2004 |
| DE | 112013003398 T5 | 4/2015 |
| WO | WO-2018233896 A1 * 12/2018 | ............... H02K 3/12 |

OTHER PUBLICATIONS

WO2018233896A1 English translation (Year: 2022).*

*Primary Examiner* — Christopher M Koehler
*Assistant Examiner* — Viswanathan Subramanian
(74) *Attorney, Agent, or Firm* — Manabu Kanesaka

(57) ABSTRACT

A stator for an electric machine includes a plurality of pins arranged on concentric circles at different distances to a stator center in slots in the stator, and each concentric circle forms a layer. In each case, six pins in different layers are serially connected to one another and form a winding. A first pin of the winding is located in a first slot in the 6n-1 layer, wherein n is an integer. A second pin of the winding is located in a second slot in the 6n layer. A third pin of the winding is located in the first slot in the 6n-2 layer. A fourth pin of the winding is located in the second slot in the 6n-3 layer. A fifth pin is located in the first slot in the 6n-5 layer. A sixth pin of the winding is located in the second slot in the 6n-4 layer.

22 Claims, 21 Drawing Sheets

(56) References Cited

U.S. PATENT DOCUMENTS

| | | | |
|---|---|---|---|
| 7,193,345 B2* | 3/2007 | Shinzaki | H02K 3/522 |
| | | | 310/179 |
| 7,242,124 B2 | 7/2007 | Ogawa et al. | |
| 9,136,738 B2 | 9/2015 | Ikeda et al. | |
| 10,461,591 B2 | 10/2019 | Sakaue et al. | |
| 2005/0248229 A1* | 11/2005 | Even | H02K 3/28 |
| | | | 310/201 |
| 2006/0033394 A1* | 2/2006 | Ogawa | H02K 3/12 |
| | | | 310/179 |
| 2012/0161569 A1 | 6/2012 | Hisada | |
| 2012/0293024 A1* | 11/2012 | Yokogawa | H02K 3/32 |
| | | | 310/43 |
| 2015/0162787 A1* | 6/2015 | Sakaue | H02K 3/28 |
| | | | 310/195 |
| 2018/0309337 A1* | 10/2018 | Lee | H02K 3/32 |
| 2019/0386533 A1* | 12/2019 | Lee | H02K 3/28 |

* cited by examiner

STATOR WITH OFFSET PINS FOR AN ELECTRIC MACHINE

RELATED APPLICATIONS

The present application is based on, and claims priority from, German Application No. DE 10 2019 135 426.9 filed Dec. 20, 2019, the disclosure of which is hereby incorporated by reference herein in its entirety.

The invention relates to a stator with offset pins for an electric machine, in particular an electric motor.

BACKGROUND INFORMATION

Electric machines are generally known and are increasingly used as electric motors for driving vehicles. An electric machine consists of a stator and a rotor.

The stator comprises a plurality of slots, in which the windings are guided. The windings may be formed from insulated copper rods, as so-called pins. The rotor is located in the stator and is connected to a rotor shaft.

Such a pin, U pin, or hairpin motor is known, for example, from U.S. Pat. No. 9,136,738 B2.

BRIEF DESCRIPTION OF THE INVENTION

The object of the present invention is to provide a stator with windings made from pins, which is easy to manufacture.

According to the invention a stator for an electric machine comprises a plurality of pins, which are arranged on concentric circles at different distances to a stator center in slots in the stator, and each concentric circle forms a layer, wherein in each case six pins in different layers are serially connected to one another and form a winding, a first pin of the winding is located in a first slot in the 6n-1 layer, wherein n is an integer, a second pin of the winding is located in a second slot in the 6n layer, wherein the second slot has a first radial distance to the first slot in a first circumferential direction of the stator, a third pin of the winding is located in the first slot in the 6n-2 layer, a fourth pin of the winding is located in the second slot in the 6n-3 layer, a fifth pin is located in the first slot in the 6n-5 layer, a sixth pin of the winding is located in the second slot in the 6n-4 layer.

A winding may thereby circulate repeatedly about the teeth. The layers may be numbered in ascending order from the outside inward to the stator center. The number zero does not belong to the mentioned integers.

A stator with the winding according to the invention may be easily produced and generates an efficient electromagnetic field. The connection types establish an electrically conductive connection between the pins in the slots. The connection type may be a welding of conductors to the pins, or the pins may already be designed as double pins, so-called U pins, and thus already establish a connection upon insertion into the stator. Furthermore, a welding of end sections of the pins bent toward one another also represents a connection type.

The stator may preferably have a first end face and a second end face, and the first pin and the second pin may be connected to one another on the second end face by means of a first connection type, the second pin and the third pin may be connected to one another on the first end face by means of a second connection type, the third pin and the fourth pin may be connected to one another on the second end face by means of a third connection type, the fourth pin and the fifth pin may be connected to one another on the first end face by means of a fourth connection type, the fifth pin and the sixth pin may be connected to one another on the second end face by means of a fifth connection type, wherein the first, second, third, fourth, and fifth connection types differ from one another.

The different connection types enable an improved manufacturing. An alternating location of the connection types on different end faces enables the efficient formation of a winding about the stator teeth lying between the slots.

Even connection types on the same end face of the stator may differ due to different bending directions of a pin foot inward or outward with respect to the stator.

The stator may additionally preferably have at least two windings, and at least the sixth pin in the second slot is connected to a seventh pin in the 6n-1 layer in a third slot by means of a sixth connection type.

A combination of the previously listed connection types on different end faces or the same end face of the stator is also possible. A simple and fast manufacturing is possible due to one same connection type on the same end faces and different connection types on different end faces of the stator. For example, the connection is established by a type of pre-bent pins, so-called double pins or also U pins, on one end face, and pins are welded to one another individually or one side of the double pin in each case is welded on another end face of the stator. The weld spots may contact the feet of the pins or double pins.

The pin at the beginning of a winding may preferably be an end pin, wherein the first end pin is configured as a single pin. A single pin is, for example, an I pin.

In one embodiment of the invention, the same first distance may lie between the third slot and the second slot as lies between the second slot and the first slot.

Additionally preferably, the stator may have a plurality of windings, which extend across the entire circumference of the stator and thereby form a partial coil.

The rotating field generated by such a winding has fewer disturbing harmonics and thus has fewer torque ripples and smaller torque fluctuations, and also better NVH properties. The windings have a symmetry which generates a uniform rotating field.

In one embodiment of the invention, the end pins at the beginning or end of a coil may be configured as single pins. A single pin is, for example, an I pin.

In another embodiment, one pin respectively from three partial coils may be connected to one another by means of a seventh connection type or an eighth connection type and form a coil (201, 202). These pins may be so-called end pins, because they mark the end of a partial coil.

The partial coils may preferably form six coils, and these may be assigned to three phases in such a way that in each case, the pins from two coils, which are assigned to a same phase, may be located in three adjacent slots.

One input of an end pin of two coils may additionally preferably be connected to one another in each case by means of a ninth connection type.

Preferably, one output of an end pin of the two coils may be connected to one another in each case, and the two coils may thus be switched in parallel and may, in particular, be assigned to one phase.

The ninth connection type may be established by a conductor applied to the pins or by a conducting ring.

The two coils may be connected in parallel and may additionally be supplied by a same phase. The parallel connection may be carried out by the paired connection of a first and seventh end pin or of a sixth and twelfth end pin.

Two coils in the same slots may be switched in parallel and supplied by one phase, so that a stator results with windings for a three-phase electric machine.

Furthermore, two phases may respectively have an approximately identical current and voltage curve, and thus a six-phase inverter may only control a three-phase motor. A current division of the switching elements is possible in the inverter using this arrangement.

The second connection type may preferably comprise a first double pin, which is formed from the second pin and the third pin, wherein the first double pin has two inwardly-bent pin feet with a weld point in each case, and bridges the first radial distance.

The double pin may consist of one rod, which is bent in such a way that two pins, a connection between these two pins on a first end, and pin feet on a second end result.

The double pin may be inserted into the stator from one end face and may be welded to the pin feet of another double pin on the other end face.

The first distance describes a number of slots to be bridged. The actual spatial distance to be bridged depends on the position of the pin in the layers, because the double pins connect different layers.

The fourth connection type may additionally preferably comprise a second double pin, which is formed from the fourth pin and the fifth pin, wherein the second double pin has two inwardly-bent pin feet with a weld point in each case, and bridges the first radial distance.

In one embodiment of the invention, the sixth connection type may comprise a third double pin, which is formed from the sixth pin and the seventh or ninth pin, wherein the third double pin has two outwardly-bent pin feet with a weld point in each case, and bridges the first radial distance.

The seventh connection type may preferably comprise a fourth double pin, which is formed from a second or fourth end pin and a third or fifth end pin, wherein the fourth double pin has two outwardly-bent pin feet with a weld point in each case, and bridges a second radial distance.

The eighth connection type may additionally preferably comprise a fifth double pin, which is formed from an eighth or tenth end pin and a ninth or eleventh end pin, wherein the fifth double pin has two inwardly-bent pin feet with a weld point in each case, and bridges a second radial distance.

In one embodiment of the invention, a first single pin may comprise a first end pin and have a pin foot bent in the clockwise direction with a weld point.

In another preferred embodiment of the invention, a second single pin may comprise a sixth end pin and have a pin foot bent in the counterclockwise direction with a weld point.

A third single pin may preferably comprise a seventh end pin and have a pin foot bent in the counterclockwise direction with a weld point.

A fourth single pin may additionally preferably comprise a twelfth end pin and have a pin foot bent in the clockwise direction with a weld point.

In one embodiment, the first connection type may be formed by a weld connection of a first weld point on the pin foot of the third double pin or of the fourth double pin or of the first single pin to a second weld point on the pin foot of the first double pin or of the fifth double pin or of the third single pin.

The third connection type may preferably be formed by a weld connection of a third weld point on the pin foot of the first double pin or of the fifth double pin to a fourth weld point on the pin foot of the second double pin.

The fifth connection type may additionally preferably be formed by a weld connection of a fifth weld point on the pin foot of the second double pin to a sixth weld point on the pin foot of the third double pin or of the fourth double pin or of the second single pin.

According to the invention, a vehicle has an electric machine with a stator according to one of the preferred embodiments.

DESCRIPTION OF THE DRAWINGS

FIG. 1 shows a stator 1 with a plurality of slots 5 in which pins 2, 3 are guided. Stator 1 has a first end face 7 and a second end face 9 lying opposite. Naturally, a rotor is additionally necessary to operate an electric machine.

FIG. 2 shows a stator 1 with slots and pins on six layers, wherein only six slots 51-56 are depicted. Pins 21-28 are arranged in the slots by way of example. The pins lie adjacent to one another in one slot. In the example from FIG. 2, there is space in one slot for six adjacent pins.

The six pins within one slot thus lie on different concentric circles L1, L2, L3, L4, L5, L6 around center M of the stator, which thus form individual layers. A first distance 11 lies between two respective slots and is identical between all slots shown in FIG. 2.

Figure 1:
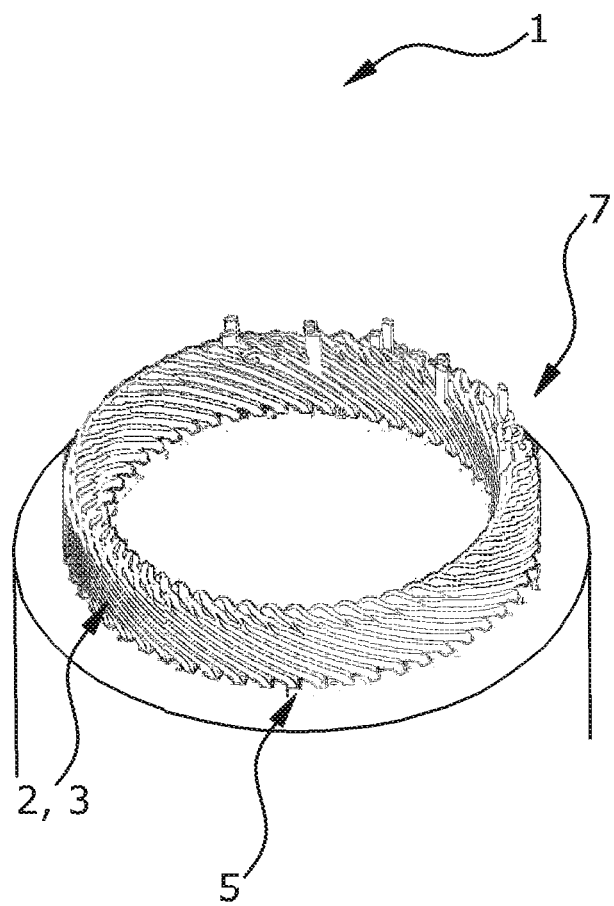
FIG. 1 shows a stator.
Figure 1:
Figure 2:
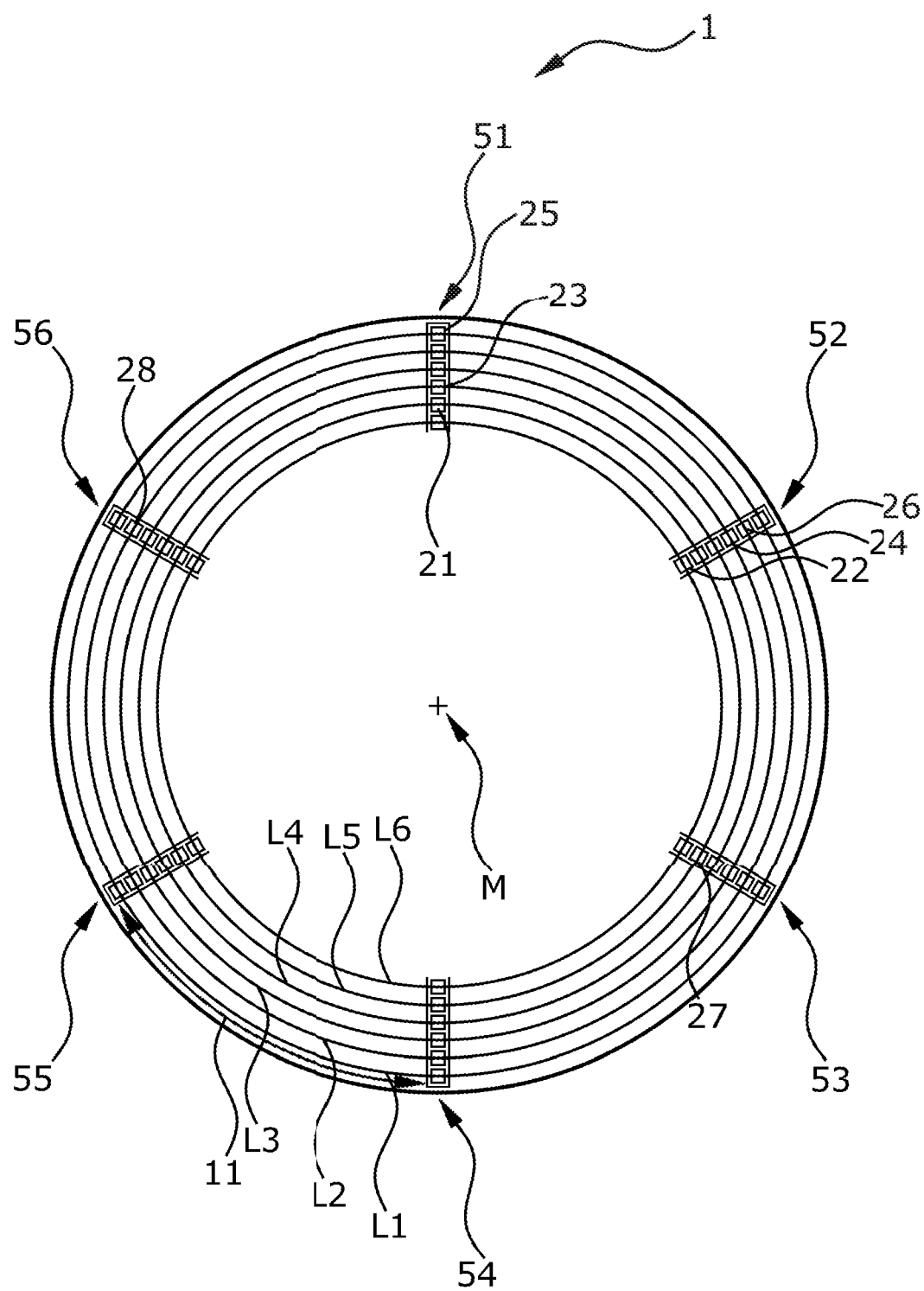
FIG. 2 shows a stator with six slots and six layers.
Figure 3:
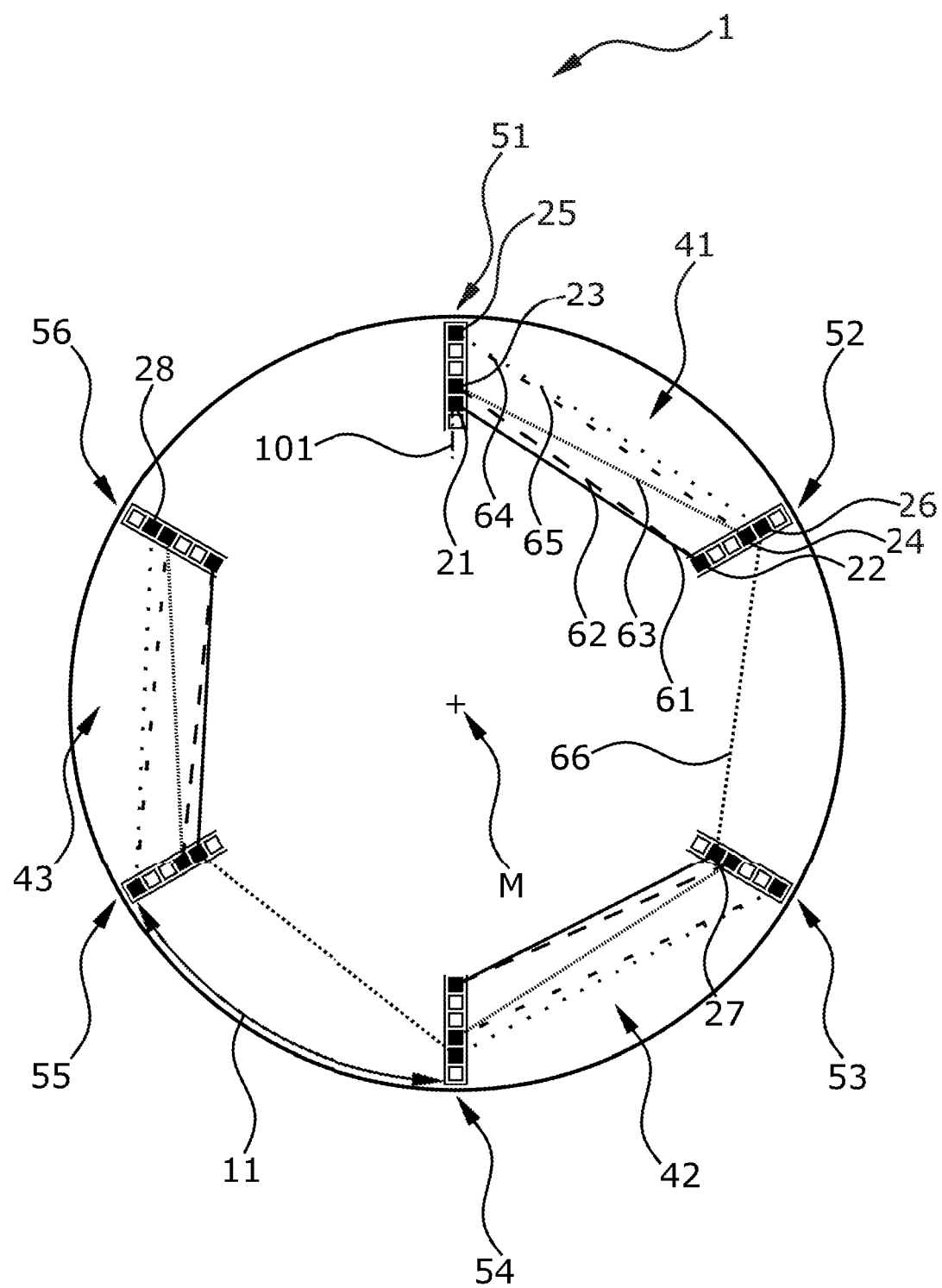
FIG. 3 shows a winding scheme of a first partial coil.

FIG. 3 shows stator 1 from FIG. 2. The pins are still arranged on concentric circles, thus layers, wherein the concentric circles are not marked for the sake of a better depiction. FIG. 3 depicts which pins are serially connected to one another. A first end pin 21 is located in a first slot 51 in layer L5. This first pin 21 is connected to a second pin 22 in a second slot 52 by means of a first connection type 61, depicted as a solid line. Second pin 22 is located in layer L6. A first distance 11, which is equal to distance 11 from FIG. 2, lies between first slot 51 and second slot 52.

Second pin 22 is connected to a third pin 23 in first slot 51 by means of a second connection type 62, depicted as a dashed line. Third pin 23 lies in layer L4 and in the same slot as first pin 21. Third pin 23 is connected to a fourth pin 24 via a third connection type 63, depicted as a densely dotted line. Fourth pin 24 lies in second slot 52, thus the same slot as second pin 22. Fourth pin 24 lies in layer L3.

Fourth pin 24 is connected to a fifth pin 25 in first slot 51 by means of a fourth connection type 64, depicted as a loosely dashed line. Fifth pin 25 is located in turn in first slot 51, thus in the same slot as first pin 21 and third pin 23. Fifth pin 25 lies in layer L1. There is thus still space for two other pins in layers L2 and L3 between third pin 23 and fifth pin 25 in first slot 51. In addition, there is still space in first slot 51 for a further pin in layer L6. Fifth pin 25 is connected to a sixth pin 26 via a fifth connection type 65, depicted as a loosely dotted line. Sixth pin 26 lies in second slot 52, thus the same slot as second pin 22 and fourth pin 24. Sixth pin 26 lies in layer L2. There is thus still space for two other pins in layers L4 and L5 between second pin 22 and fourth pin 24 in second slot 52. In addition, there is still space in second slot 52 for a further pin in layer L1.

The connection of the first, second, third, fourth, fifth, and sixth pins forms a first winding 41. First pin 21 is simultaneously also a first end pin. This end pin 21 has an input 101 for connecting to an energy source, for example, an inverter. First end pin 21 is therefore only connected to one other pin, thus to second pin 22. First end pin 21 may thus be configured as a so-called single pin or I pin.

Sixth pin 26 is connected to a seventh pin 27 in layer L5 in a third slot 53 via a sixth connection type 66, depicted as a dotted line. At seventh pin 27, the previously-described serial connection of the consecutive pins in the stator begins again, wherein seventh pin 27 is similar to first pin 21 with an offset of the slot by 120 degrees. In contrast to first pin 21, seventh pin 27 is not an end pin, as seventh pin 27 is connected to two other pins, thus to sixth pin 26 and to another pin in slot 54, layer L1.

The serial connection of seventh pin 27 to other pins in slot 54 forms a second winding 42. The first, second, third, fourth, and fifth connection types 61-65 between these pins is identical to the respective first, second, third, fourth, and fifth connection types 61-65 of the pins of first winding 41.

The two windings 41, 42 are connected by sixth connection type 66. Due to the continuation of the serial connection, a third winding 43 is formed in two other slots 55 and 56. Windings 41, 42, 43 are each connected using sixth connection type 66. Sixth connection type 66 between the respective windings is thus identical. The first, second, third, fourth, and fifth connection types 61-65 between the pins of third winding 43 are also identical to first, second, third, fourth, and fifth connection types 61-65 of first and second windings 41, 42.

Due to the continuation of the serial connection, fourth winding 44 is formed in two other slots 57 and 58. Windings 41, 42, 43, 44 are each connected using sixth connection type 66. Sixth connection type 66 between the respective windings is thus identical. First, second, third, fourth, and fifth connection types 61-65 between the pins of fourth winding 44 are also identical to first, second, third, fourth, and fifth connection types 61-65 of first, second, and third windings 41, 42, 43.

Four windings 41, 42, 43, 44 form a first partial coil by way of one circuit clockwise about stator 1. First pin 21 additionally has an input 101 for connecting to an energy source. First pin 21 of winding 41 thus represents a first end pin. The partial coil ends with pin 28 of third winding 43.

Last pin 28 of third winding 43 thus represents a second end pin. Second end pin 28 has, however, in contrast to first end pin 21, connections to two other pins, as is explained in connection to FIG. 6.

Figure 4:
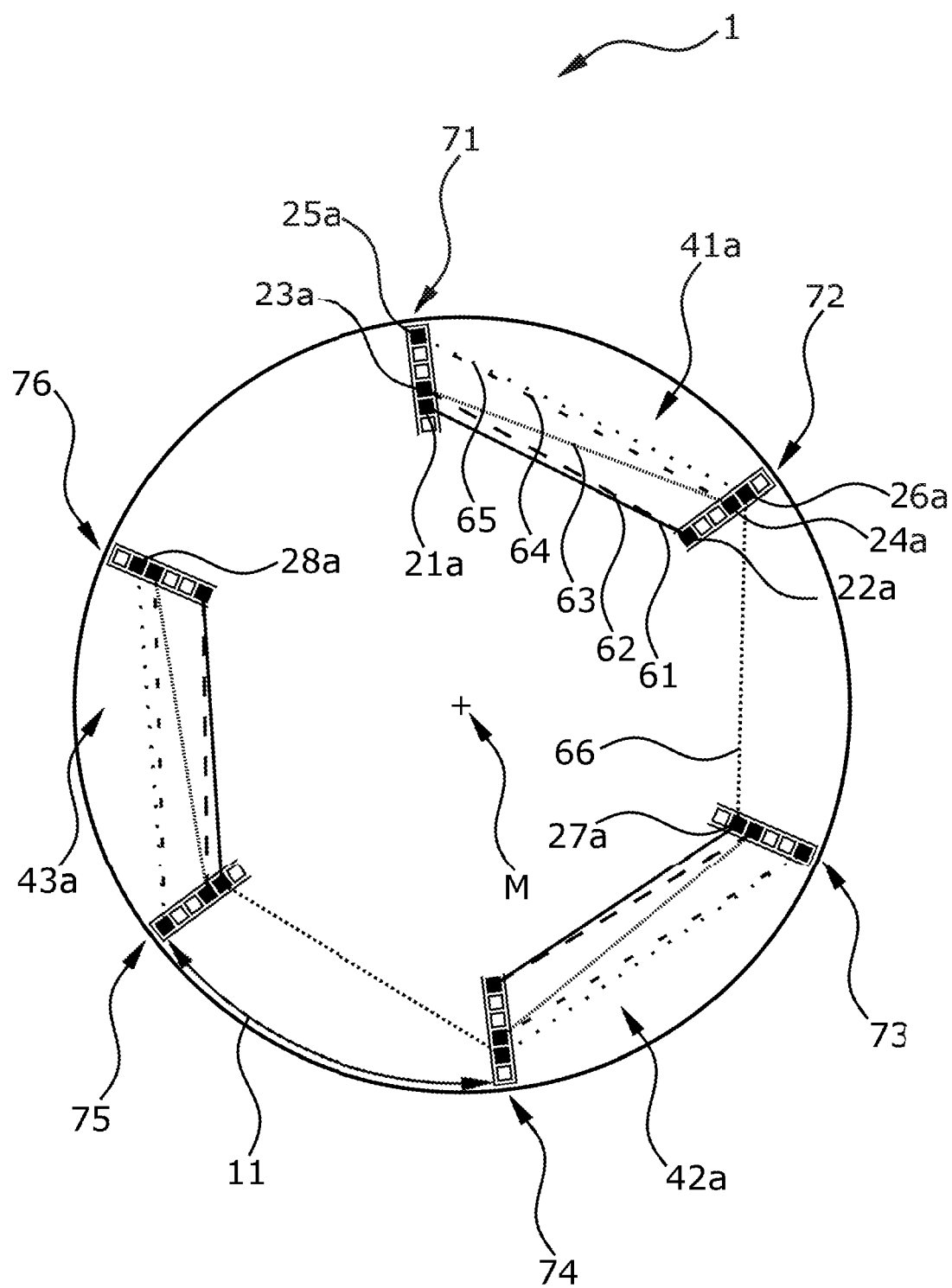
FIG. 4 shows a winding scheme of a second partial coil.

FIG. 4 shows stator 1 from FIG. 3, wherein six other slots 71-76 are shown, which are located directly adjacent to slots 51-56 from FIG. 3. Distance 11 has the same length as in FIG. 3.

Pins 21a-28a are connected in the same way as pins 21-28 of FIG. 3. Even the connection types are identical with FIG. 3 and are clearly expressed by identical reference numerals. Windings 41a, 42a, 43a are formed in the same way as is described in FIG. 3, and connected clockwise to one another by sixth connection type 66.

Three windings 41a, 42a, 43a form a second partial coil by way of one circuit about stator 1. The partial coil begins with a pin 21a, which is a third end pin. Third end pin 21a has, however, in contrast to first end pin 21, connections to two other pins, as is explained in connection to FIG. 6. The partial coil ends with pin 28a of winding 43a. Last pin 28a of winding 43a thus represents a fourth end pin 28a.

Figure 5:
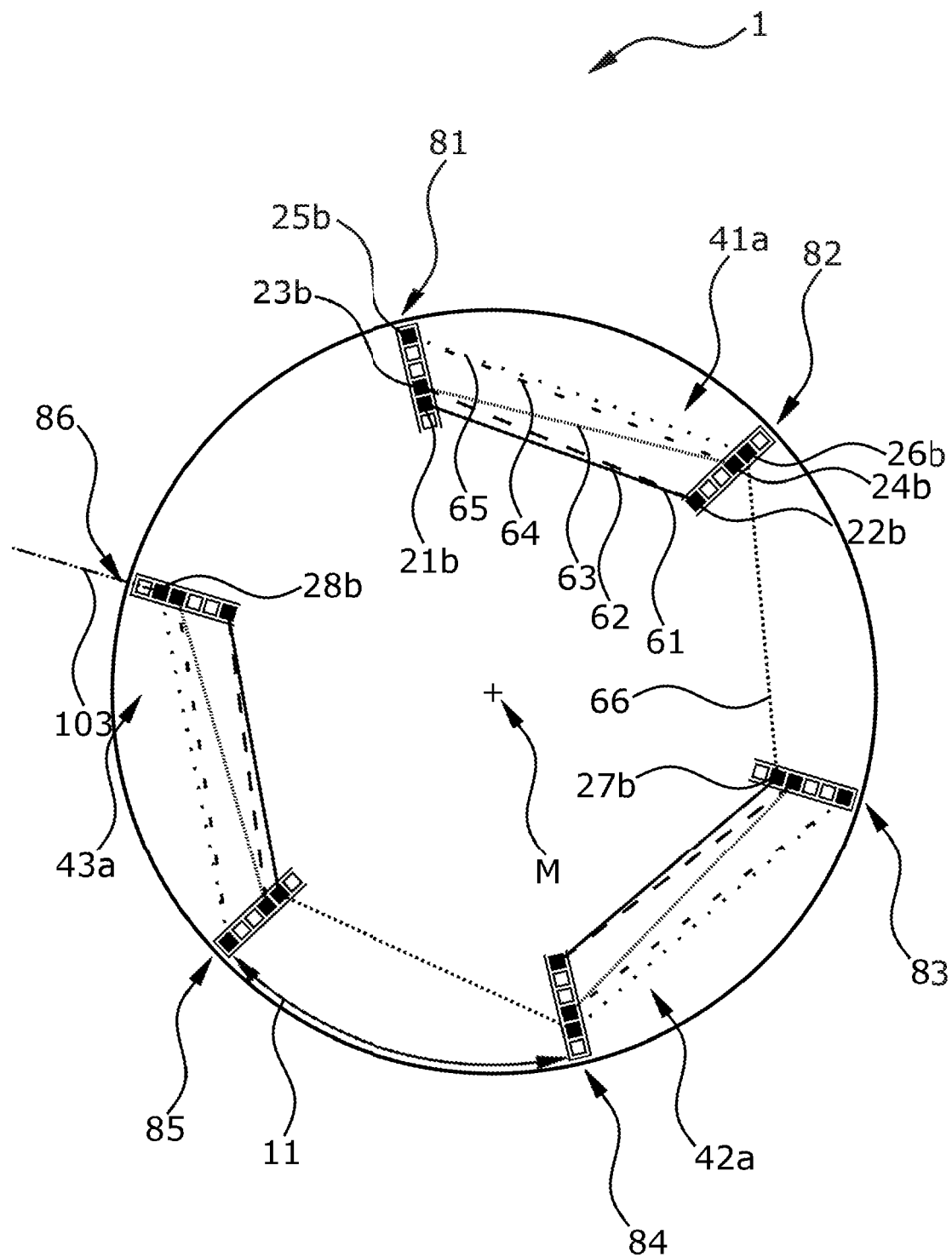
FIG. 5 shows a winding scheme of a third partial coil.

FIG. 5 shows stator 1 from FIGS. 3 and 4, wherein six other slots 81-86 are shown, which are located directly adjacent to slots 71-76 from FIG. 4. Distance 11 has the same length as in FIG. 3.

Pins 21b-28b are connected in the same way as pins 21-28 of FIG. 3 and pins 21a-28a of FIG. 4. Even the connection types are identical with FIGS. 3 and 4 and are clearly expressed by identical reference numerals. Windings 41b, 42b, 43b are formed in the same way as is described in FIGS. 3 and 4, and connected clockwise to one another by sixth connection type 66.

Three windings 41b, 42b, 43b form a third partial coil by way of one circuit about stator 1. The partial coil begins with a pin 21b, which is a fifth end pin. Fifth end pin 21b has, however, in contrast to first end pin 21, connections to two other pins, as is explained in connection to FIG. 6. The partial coil ends with pin 28b of winding 43b. Last pin 28b of winding 43b thus represents a sixth end pin. Sixth end pin 28b is in turn designed similar to the first end pin 21, thus, for example, as a single pin or I pin and has an output 103 for connecting to an energy source.

Figure 6:
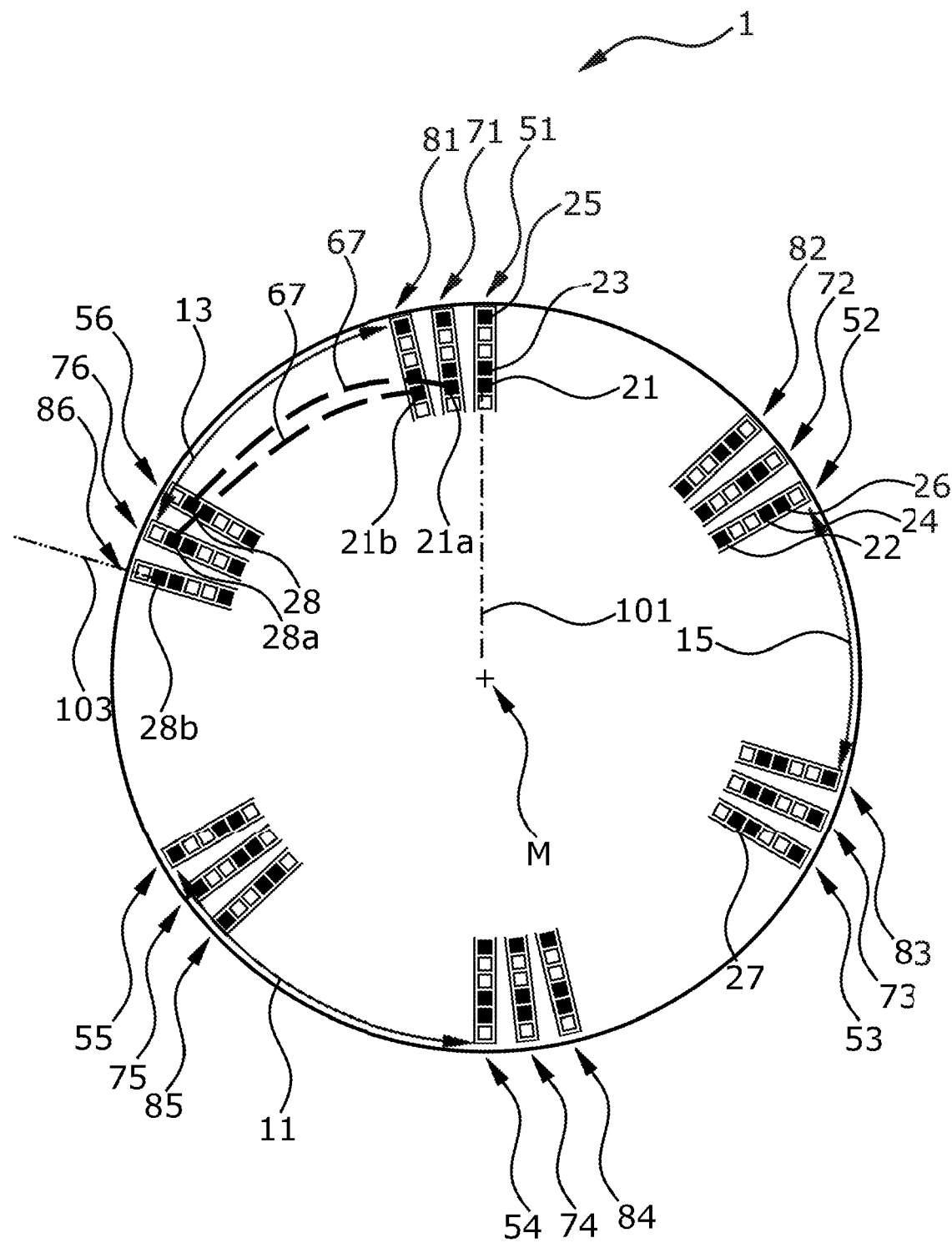
FIG. 6 shows a stator with three partial coils and their connection to one another and thus a first coil.

FIG. 6 shows a pin assignment by the first, second, and third partial coils from FIGS. 3, 4, and 5, which are depicted by black squares. Identical reference numerals designate identical pins, slots, connections in the figures.

Second end pin 28 of third winding 43 of the first partial coil in slot 56, layer L2 and third end pin 21a of first winding 41a of the second partial coil in slot 71, layer L5 are connected by a seventh connection type 67. The seventh connection type bridges a second distance 13, which is one slot shorter than first distance 11. Fourth end pin 28a of winding 43a of the second partial coil in slot 76, layer L5 and fifth end pin 21b of first winding 41b of the third partial coil in slot 81, layer L2 are connected by a seventh connection type 67. The seventh connection type bridges second distance 13.

Seventh connection type 67 thus connects two partial coils respectively, wherein three partial coils form a first coil 201 with an input 101 and an output 103 after three radial circuits clockwise about the stator.

Figure 7:
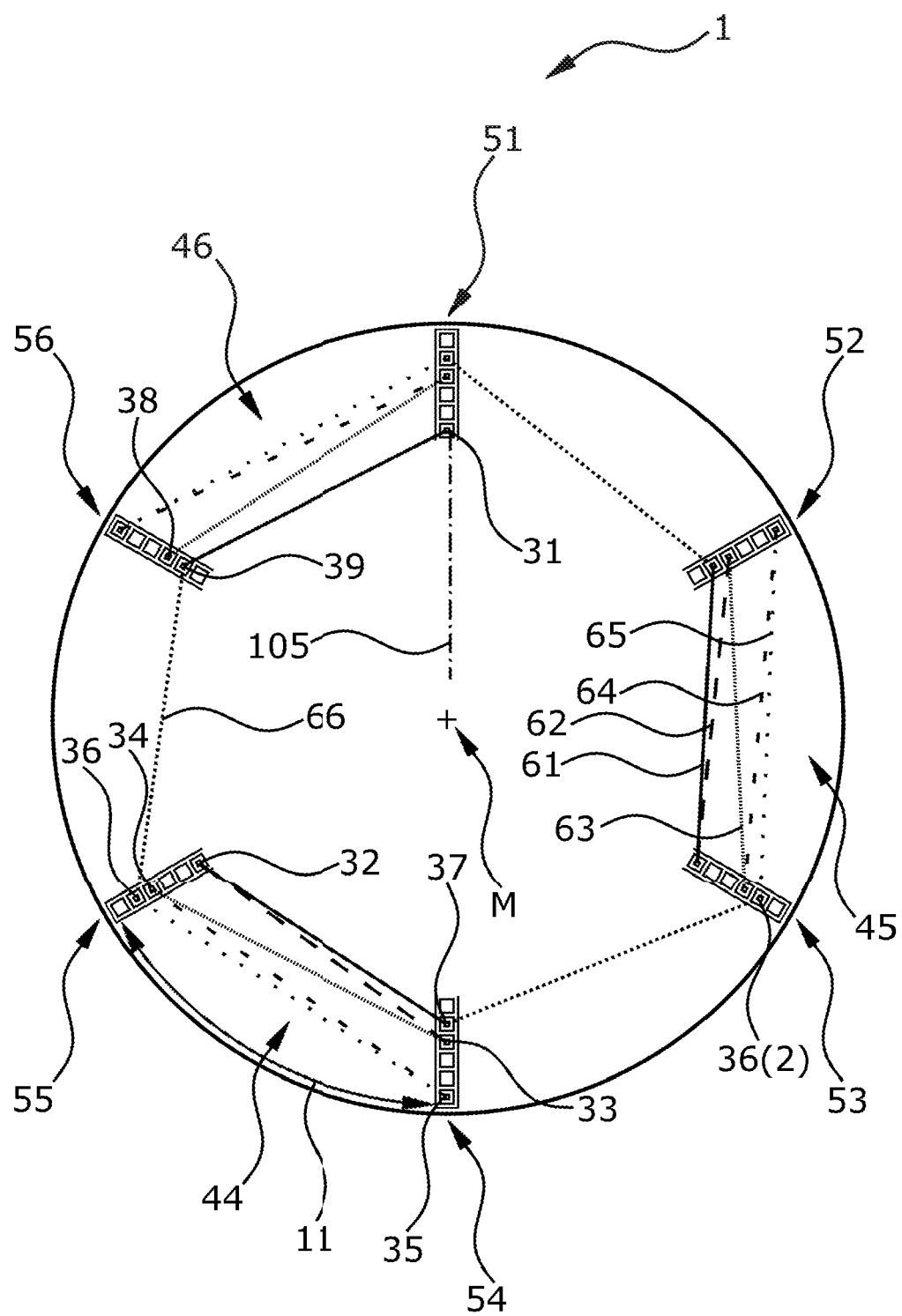
FIG. 7 shows a winding scheme of another first partial coil.

FIG. 7 shows stator 1 from FIG. 2. The pins are still arranged on concentric circles, thus layers, wherein the concentric circles are not marked for the sake of a better depiction. It depicts which pins, depicted as black squares on a white background, are serially connected to one another and form a first partial coil of a second coil 202.

A first end pin 31 is located in first slot 51 in layer L6. First pin 31 is simultaneously also a seventh end pin 31. This end pin 31 has an input 105 for connecting to an energy source, for example, an inverter. Seventh end pin 31 is therefore only connected to one other pin, thus to a ninth pin 39. Seventh end pin 31 may thus be configured as a so-called single pin or I pin. First pin 31, of the seventh end pin, is connected to a ninth pin 39 in a slot 56 by means of first connection type 61, depicted as a solid line. Ninth pin 39 is located in layer L5. A first distance 11, which is equal to distance 11 from FIG. 2, lies between first slot 51 and slot 56.

Ninth pin 39 is connected to a sixth pin 36 in a slot 55 via a sixth connection type 66, depicted as a dotted line. Sixth pin 36 lies in layer L2. Sixth pin 36 is connected to a fifth pin 35 in slot 54 via a fifth connection type 65, depicted as a loosely dotted line. Fifth pin 35 lies in layer L1. Fifth pin 35 is connected to a fourth pin 34 in a slot 55 by means of fourth connection type 64, depicted as a loosely dashed line.

Fourth pin 34 is connected to a third pin 33 via third connection type 63, depicted as a densely dotted line. Third pin 33 lies in a slot 54. Third pin 33 lies in layer L4. Third pin 33 is connected to a second pin 32 in slot 55 via second connection type 62, depicted as a short dashed line. Second pin 32 lies in layer L6. Second pin 32 lies in slot 55, thus the same slot as fourth pin 34 and sixth pin 36. Second pin 32 lies in layer L6. There is thus still space for two other pins in layers L4 and L5 between second pin 32 and fourth pin 34 in second slot 55. In addition, there is still space in slot 55 for a further pin in layer L1.

Second pin 32 is connected to a seventh pin 37 in slot 54 via first connection type 61, depicted as a solid line. Seventh pin 37 lies in layer L5. Seventh pin 37 is located in slot 54, thus in the same slot as third pin 33 and fifth pin 35. There is still space for two other pins in layers L2 and L3 between fifth pin 35 and third pin 33 in slot 54. In addition, there is still space in slot 54 for a further pin in layer L6.

The connection of the second, third, fourth, fifth, sixth and seventh pins 32-37 forms a fourth winding 44.

Seventh pin 37 is connected to a tenth pin 36(2) via sixth connection type 66, depicted as a dotted line. Tenth pin 36(2) lies in third slot 53 in layer L2. At tenth pin 36(2), the previously-described serial connection of the consecutive pins in the stator begins again, wherein tenth pin 36(2) is similar to sixth pin 36 with an offset of the slot by 120 degrees.

The serial connection of tenth pin 36(2) to other pins in second slot 52 forms a fifth winding 45. First, second, third, fourth, and fifth connection types 61-65 between these pins is identical to respective first, second, third, fourth, and fifth connection types 61-65 of the pins of first through fourth windings 41-44.

Figure 10:
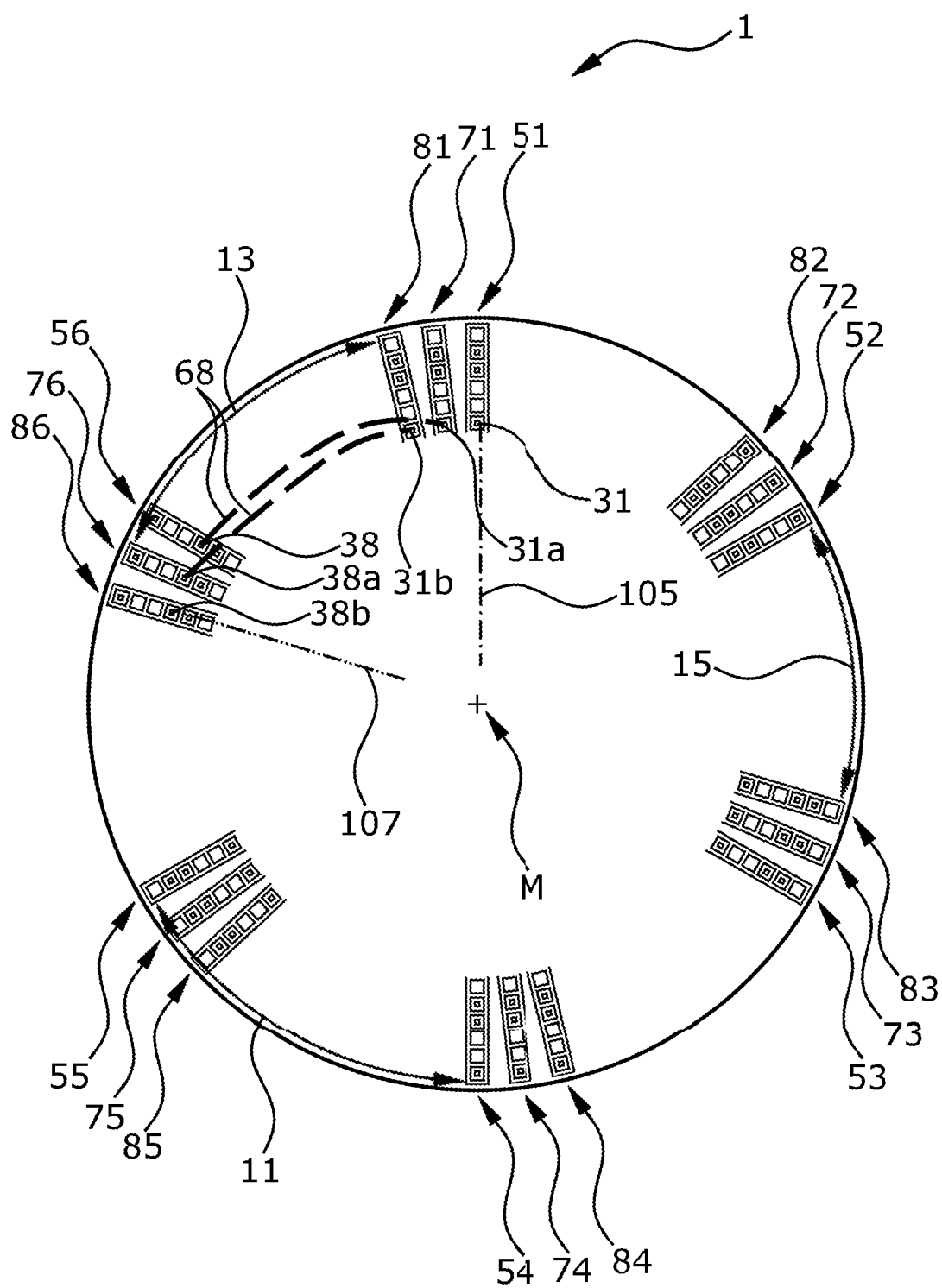
FIG. 10 shows a stator with three other partial coils and their connection to one another and thus a second coil.

The two windings 44, 45 are connected by sixth connection type 66. Due to the continuation of the serial connection, sixth winding 46 is formed in two other slots 51 and 56. Windings 44-46 are each connected using sixth connection type 66. Sixth connection type 66 between the respective windings is thus identical. First, third, fourth, and fifth connection types 61, 63-65 between the pins of sixth winding 46 are also identical to first, third, fourth, and fifth connection types 61, 63-65 of preceding windings 41-45. Sixth winding 46 is completed by a connection of an eighth connection type 68. This connection is shown in FIG. 10 and is described in conjunction with this figure.

Four windings 45-48 form a first partial coil by way of one circuit counterclockwise about stator 1. The first partial coil of second coil 202 ends with an eighth end pin 38.

Figure 8:
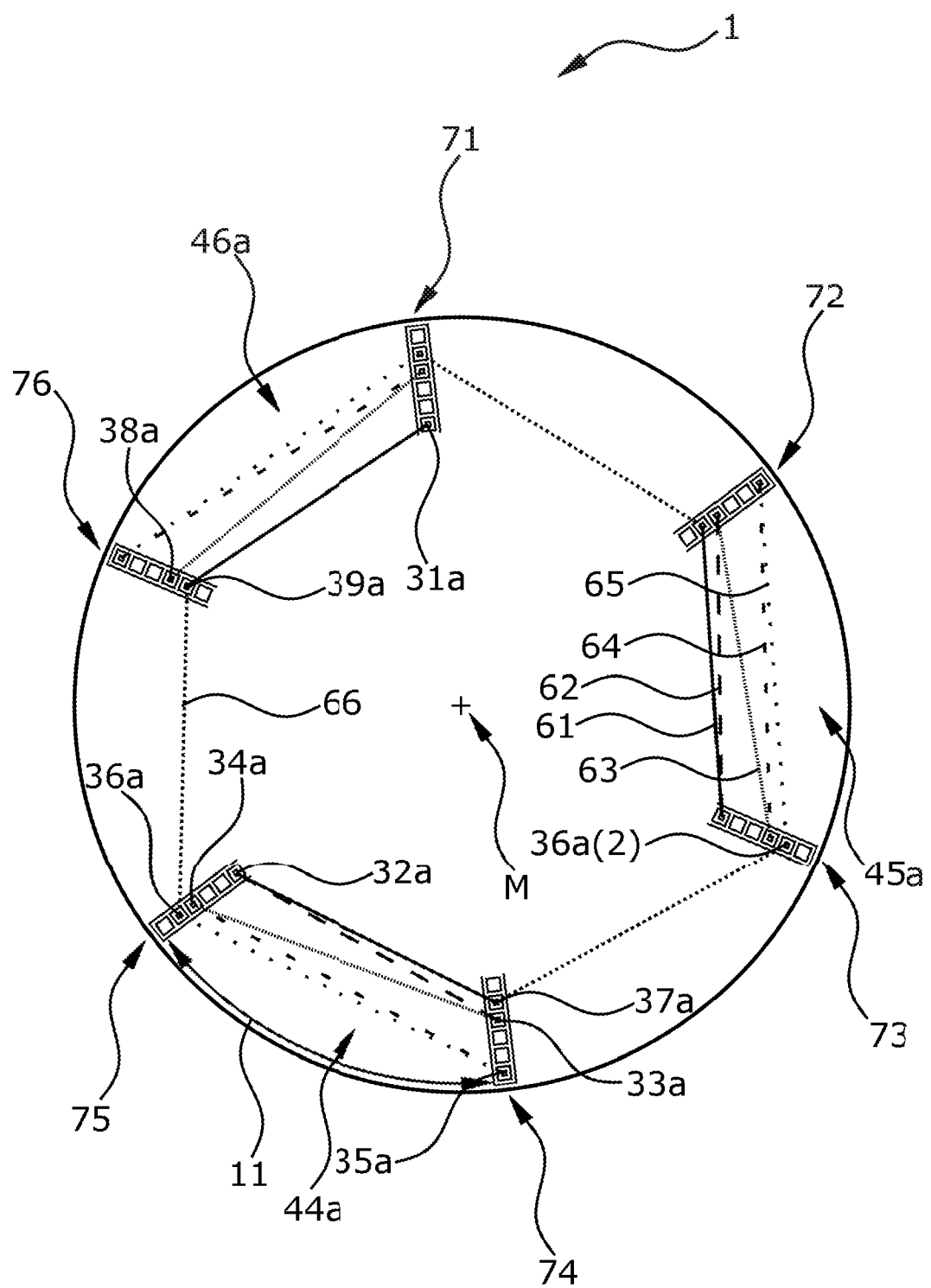
FIG. 8 shows a winding scheme of another second partial coil.

FIG. 8 shows stator 1 from FIG. 7, wherein six other slots 71-76 are shown, which are located directly adjacent to slots 51-56 from FIG. 7. Distance 11 has the same length as in the preceding figures.

Pins 31a-39a are connected in the same way as pins 31-39 of FIG. 7. Even the connection types are identical with the preceding figures and are clearly expressed by identical reference numerals. Windings 44a, 45a, 46a are formed in the same way as is described in FIG. 7, and connected counterclockwise to one another by sixth connection type 66.

Three windings 44a, 45a, 46a form a second partial coil by way of one circuit counterclockwise about stator 1. The partial coil begins with a pin 31a, which is a ninth end pin. Ninth end pin 31a has, however, in contrast to seventh end pin 31, connections to two other pins, as is explained in connection with FIG. 10. The partial coil ends with pin 38a of winding 46a. Pin 38a of winding 46a thus represents a tenth end pin 38a. Furthermore, winding 46a has two end pins 31a, 38a.

Figure 9:
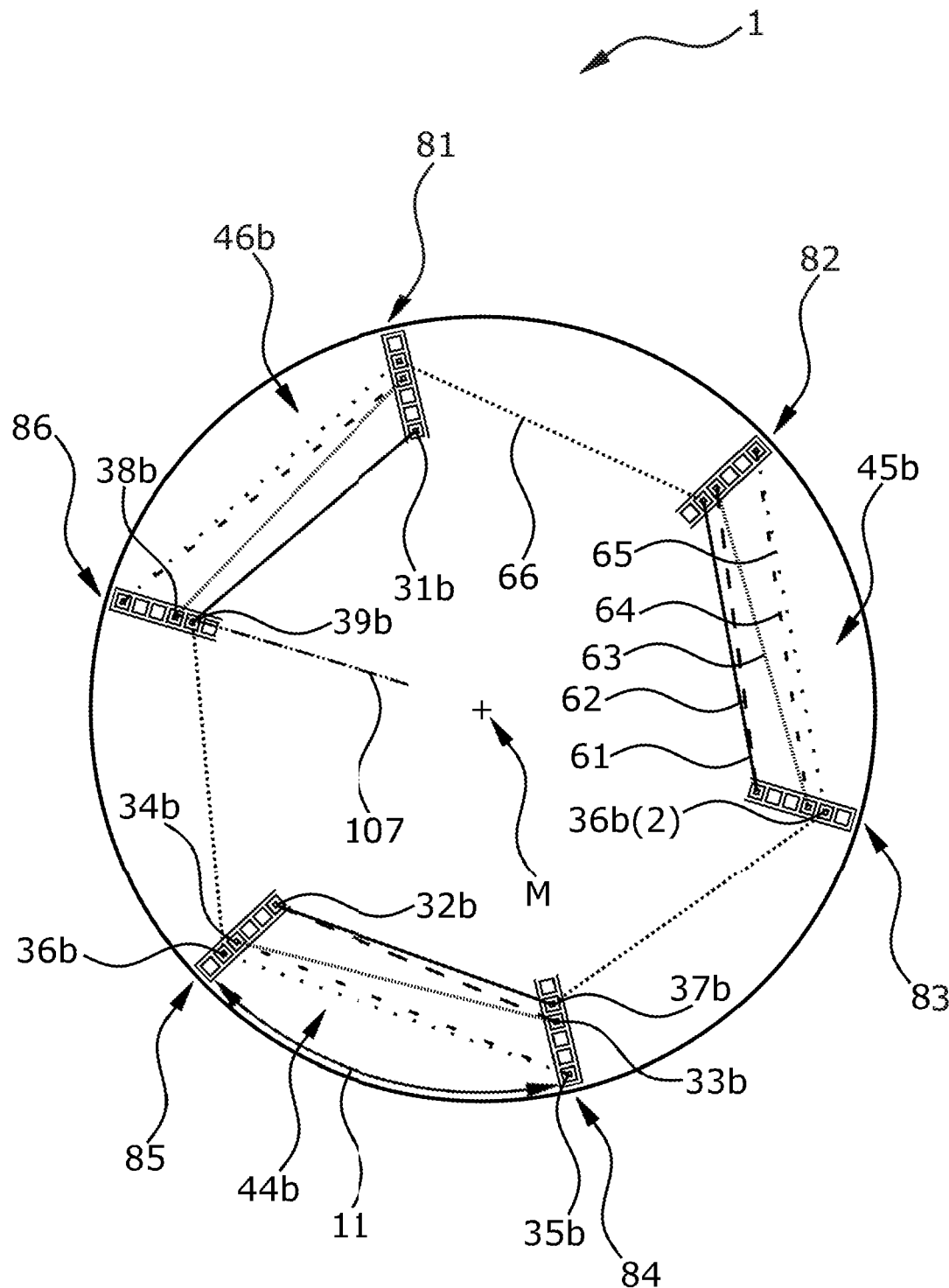
FIG. 9 shows a winding scheme of another third partial coil.

FIG. 9 shows stator 1 from FIGS. 7 and 8, wherein six other slots 81-86 are shown, which are located directly adjacent to slots 71-76 from FIG. 8. Distance 11 has the same length as in the preceding figures.

Pins 31b-39b are connected in the same way as pins 31-39 of FIG. 7 and pins 31a-39a of FIG. 8. Even the connection types are identical with the preceding figures and are clearly expressed by identical reference numerals. Windings 44b, 45b, 46b are formed in the same way as is described in FIGS. 7 and 8, and connected counterclockwise to one another by sixth connection type 66.

Three windings 44b, 45b, 46b form a third partial coil by way of one circuit about stator 1. The partial coil begins with a pin 31b, which is an eleventh end pin. Eleventh end pin 31b has, however, in contrast to seventh end pin 31, connections to two other pins, as is explained in connection with FIG. 10. The partial coil ends with pin 38b of winding 46b. Pin 38b of winding 46b thus represents a twelfth end pin. Twelfth end pin 38b is in turn designed similar to the seventh end pin, thus, for example, as a single pin or I pin and has an output 107 for connecting to an energy source.

FIG. 10 shows a pin assignment by the first, second, and third partial coils of second coil 202 from FIGS. 7, 8, and 9, which are depicted by black squares on a white background. Identical reference numerals designate identical pins, slots, connections in the figures.

Eighth end pin 38 of winding 46 of the first partial coil in slot 56, layer L3 and ninth end pin 31a of winding 46a of the second partial coil in slot 71, layer L1 are connected by an eighth connection type 68. The eighth connection type bridges a second distance 13, which is one slot shorter than the first distance. Tenth end pin 38a of winding 46a of the second partial coil in slot 76, layer L3 and eleventh end pin 31b of winding 46b of the third partial coil in slot 81, layer L1 are connected by eighth connection type 68.

Eighth connection type 68 thus connects two partial coils respectively, wherein three partial coils form second coil 202 with an input 105 and an output 107 after three radial circuits counterclockwise about the stator. A third distance 15, depicted in the figure, is two slots shorter than first distance 11 from the previous figures. The blocks of the three adjacent slots, which are occupied by pins of the coil, have in each case third distance 15 from one another.

Figure 11:
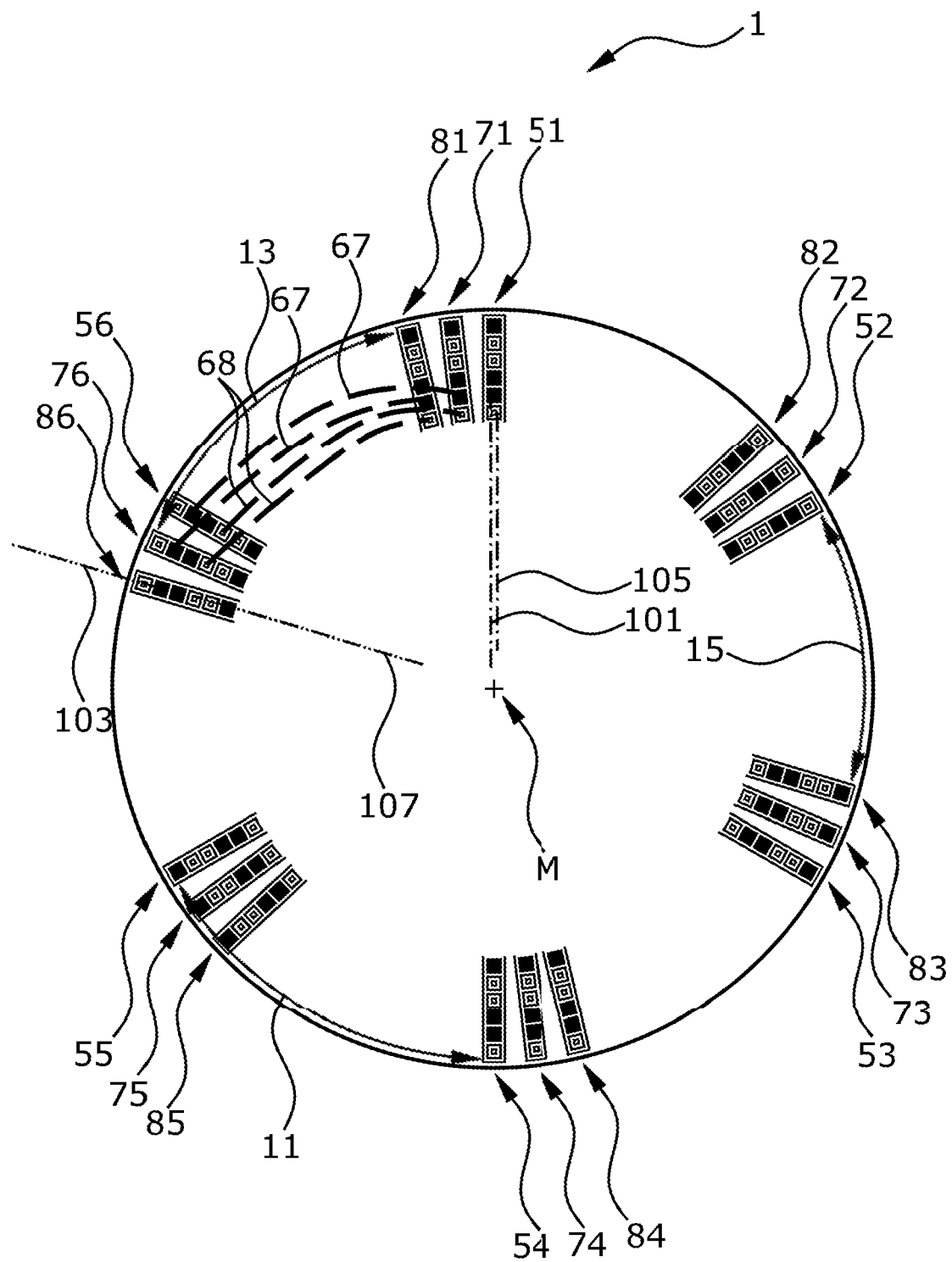
FIG. 11 shows a stator with two coils consisting of three partial coils respectively.

FIG. 11 shows first coil 201 and second coil 202 from the previous figures in a stator 1. Identical reference numerals from the previous figures designate identical pins, slots, and connection types.

Figure 12:
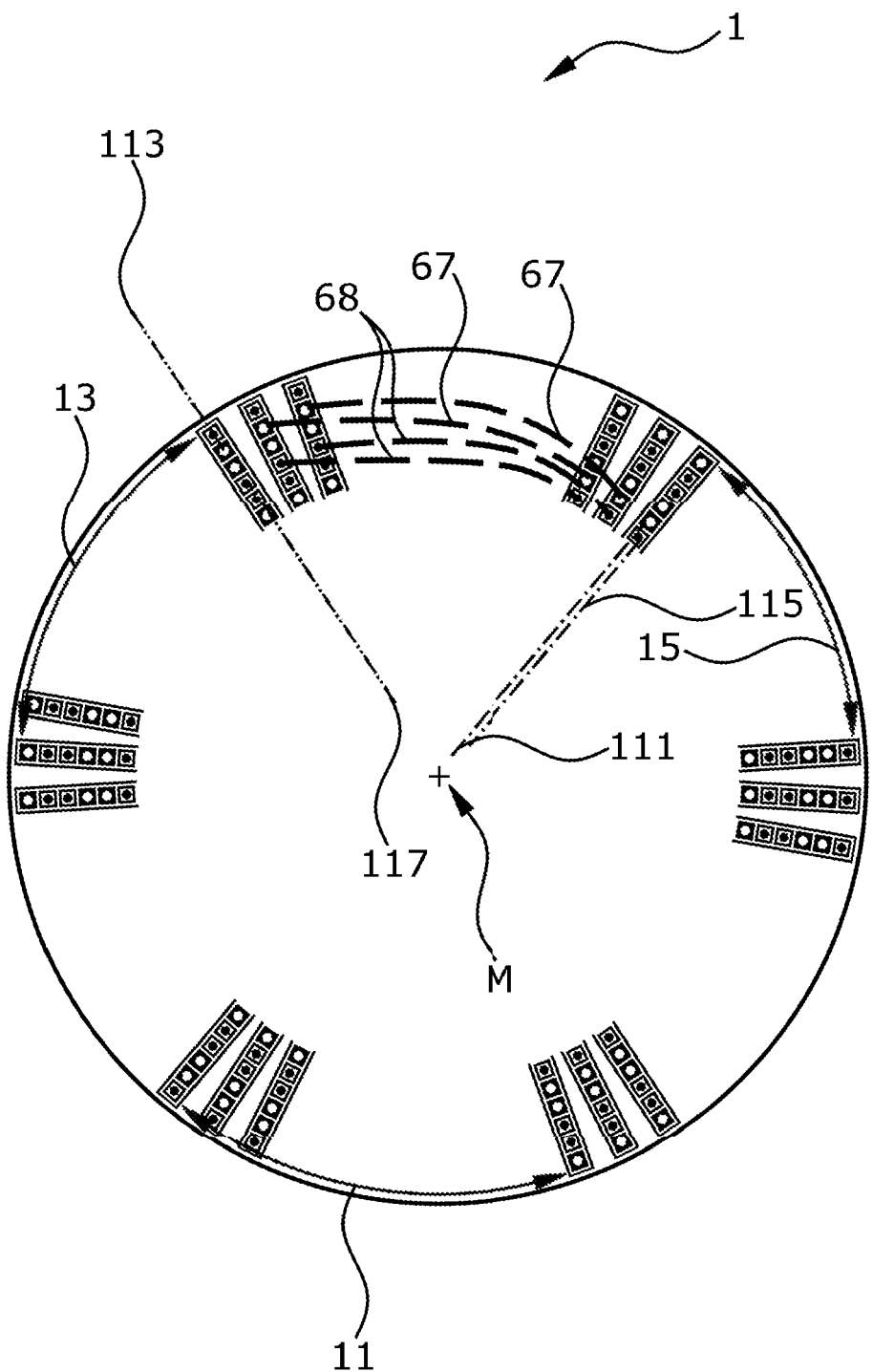
FIG. 12 shows a stator with two other coils.

FIG. 12 shows two other coils, which are respectively formed by pins with a black dot or with a white dot. The three partial coils of the coil with the pins with a white dot are formed according to the description of FIGS. 3-6, wherein the slots are offset by 20 degrees in the clockwise direction. The three partial coils of the coil with the pins with a black dot are formed according to the description of FIGS. 7-10, wherein the slots are rotated in the clockwise direction by 20 degrees.

Figure 13:
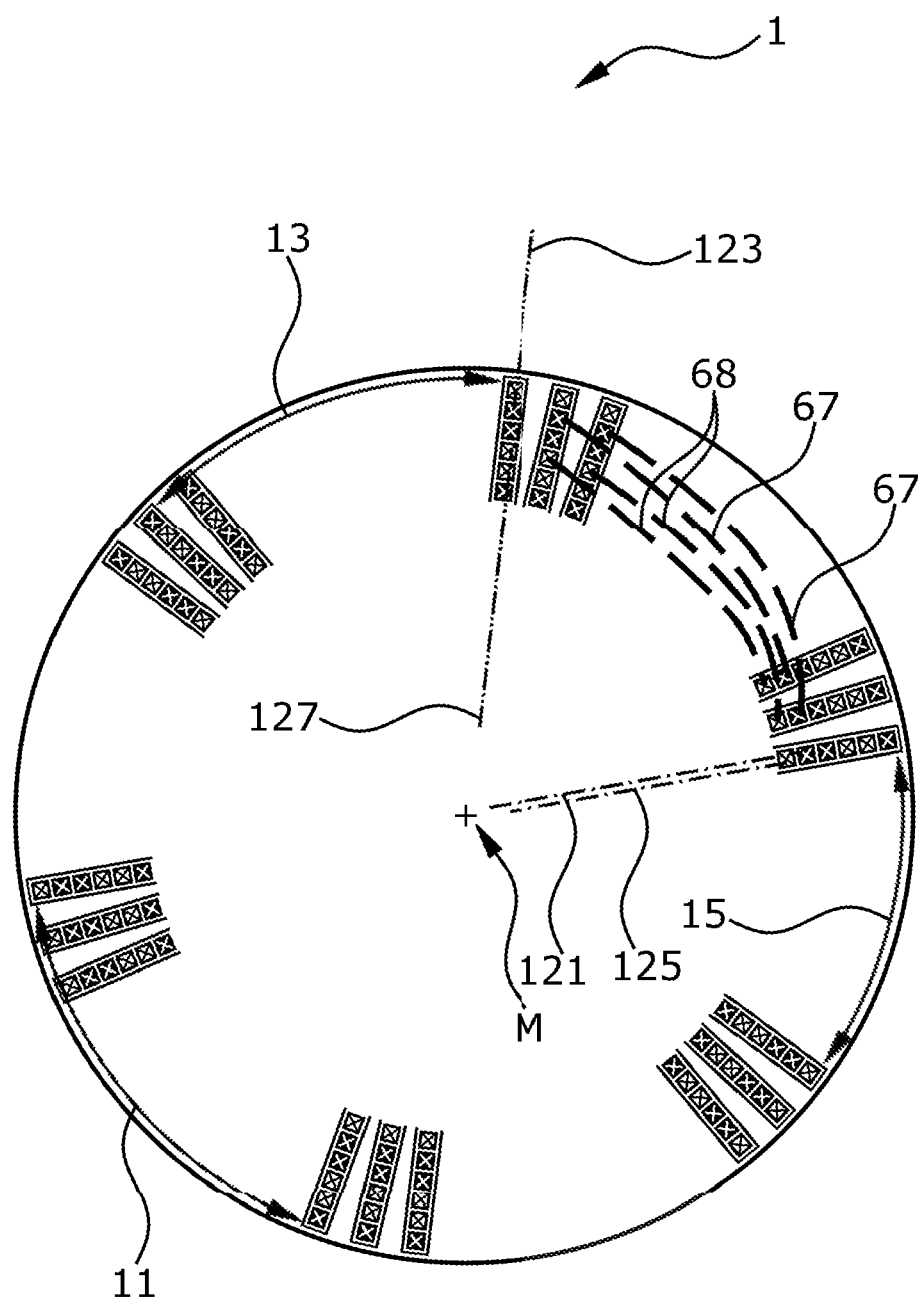
FIG. 13 shows a stator with two other coils.

FIG. 13 shows two other coils, as they are respectively formed by pins with a black cross or with a white cross. The three partial coils of the coil with the pins with a white cross are formed according to the description of FIGS. 3-6, wherein the slots are offset by 40 degrees in the clockwise direction. The three partial coils of the coil with the pins with a black cross are formed according to the description of FIGS. 7-10, wherein the slots are offset by 40 degrees in the clockwise direction.

Figure 14:
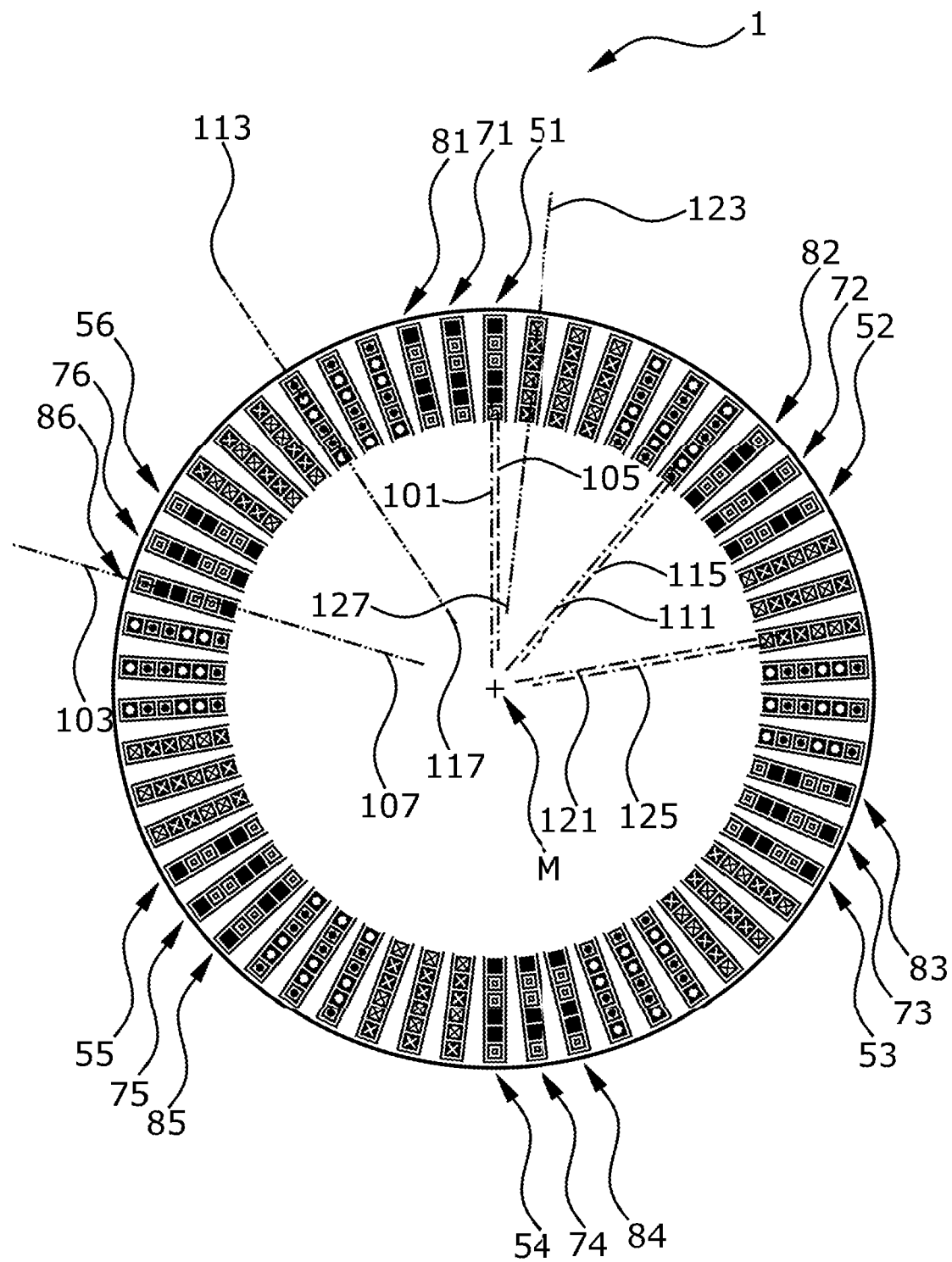
FIG. 14 shows a stator with six coils.

FIG. 14 shows a pin assignment by the six coils as a combination from FIGS. 11, 12, and 13. In particular, it is clear from the location of inputs 101, 105, 111, 115, 121, 125 and outputs 103, 107, 113, 117, 123, 127 that an interconnection of the coils may be carried out within twenty four slots. In the stator with fifty four slots, depicted by way of example, an interconnection of the inputs and outputs is thus possible within slightly less than one-half of the stator circumference. Purely with reference to the inputs or outputs, a separate switching would be possible within thirteen slots.

Figure 15:
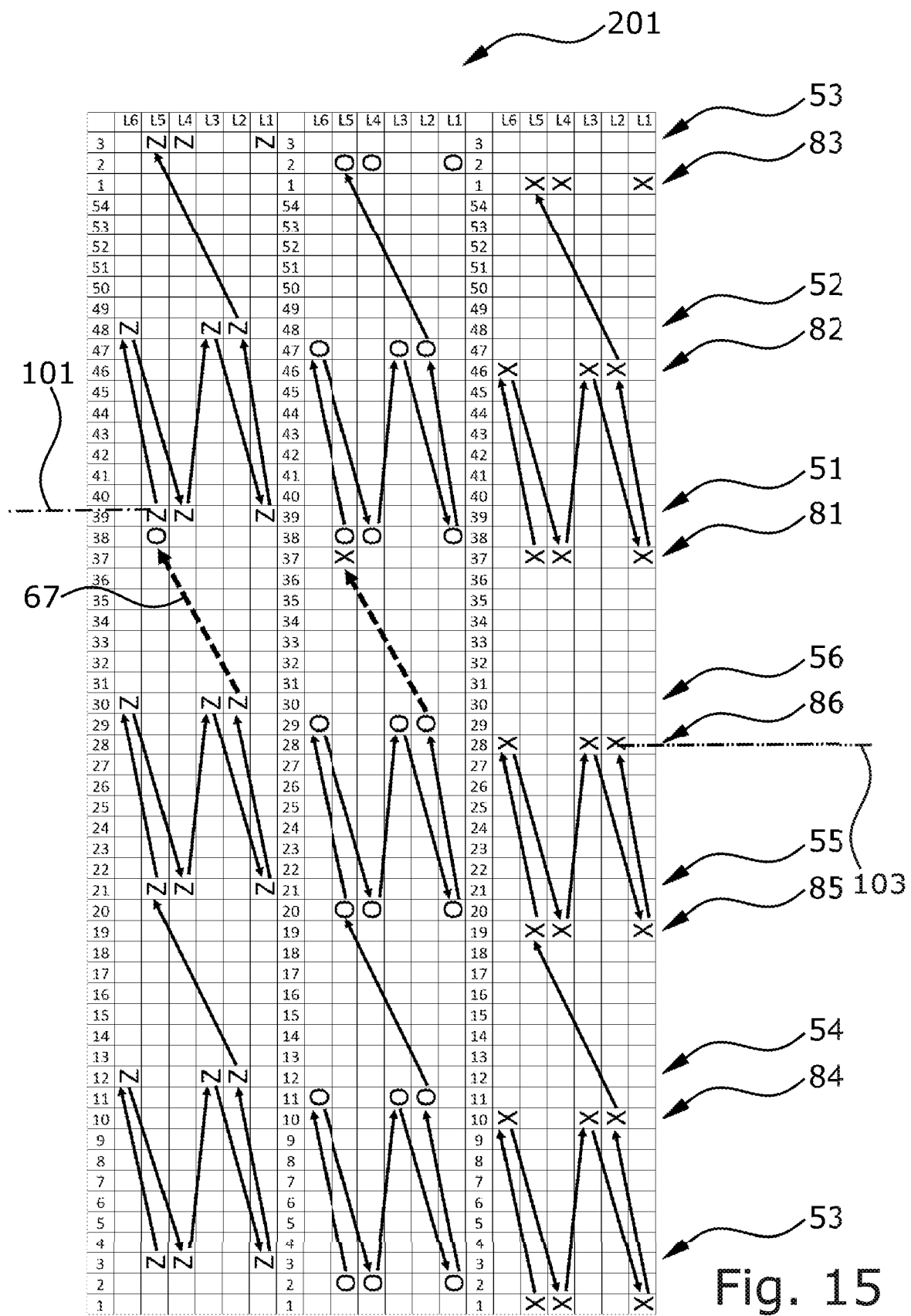
FIG. 15 shows a winding scheme of a first coil.

FIG. 15 shows the winding scheme of three partial coils of first coil 201. The consecutive "slot number" is not a reference numeral. The reference numerals with arrows to the slots are identical to the preceding figures and enable a comparison with these figures.

Figure 16:
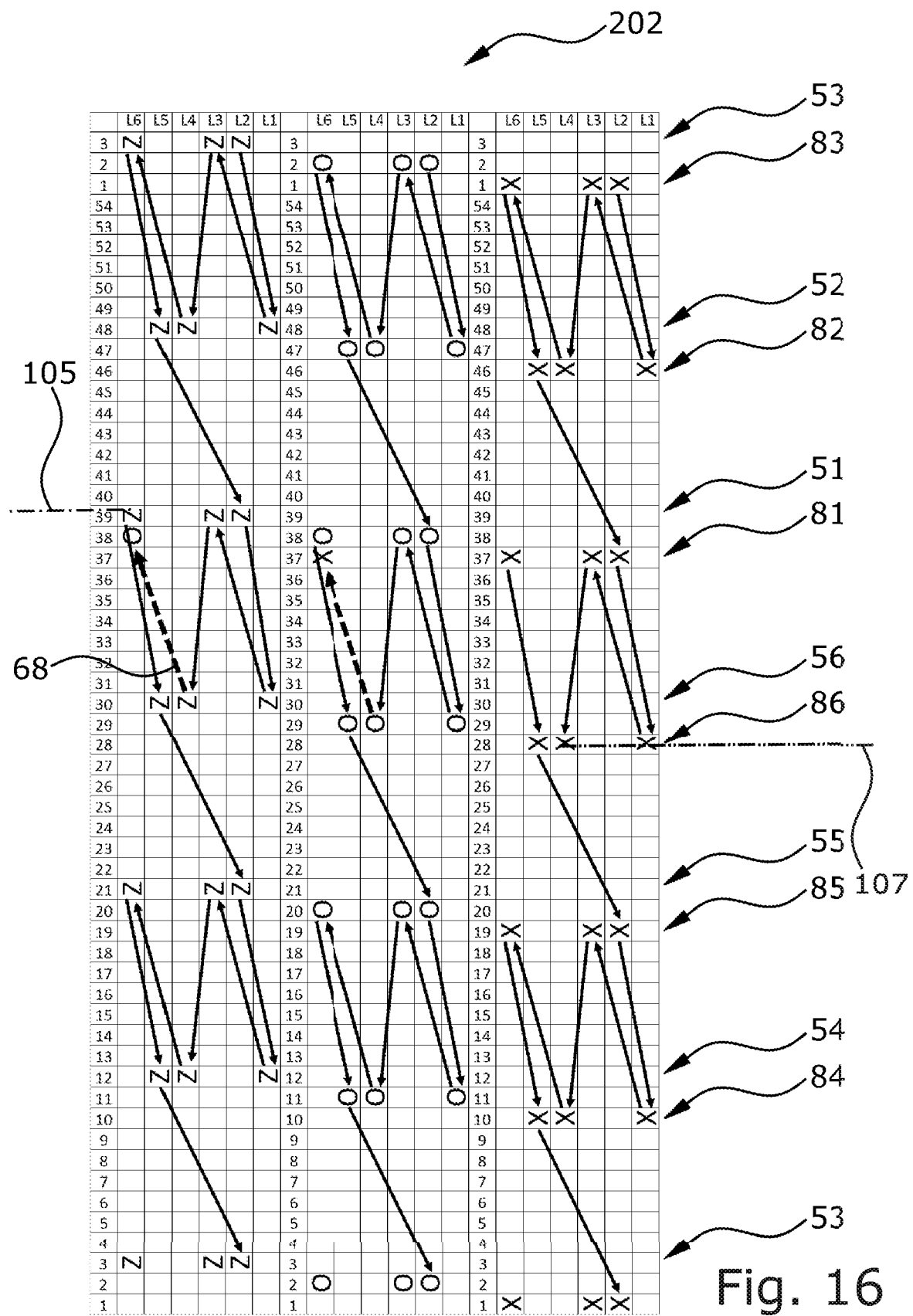
FIG. 16 shows a winding scheme of a second coil.

FIG. 16 shows the winding scheme of three partial coils of second coil 202. The consecutive "slot number" is not a reference numeral. The reference numerals with arrows to the slots are identical to the preceding figures and enable a comparison with these figures.

Figure 17:
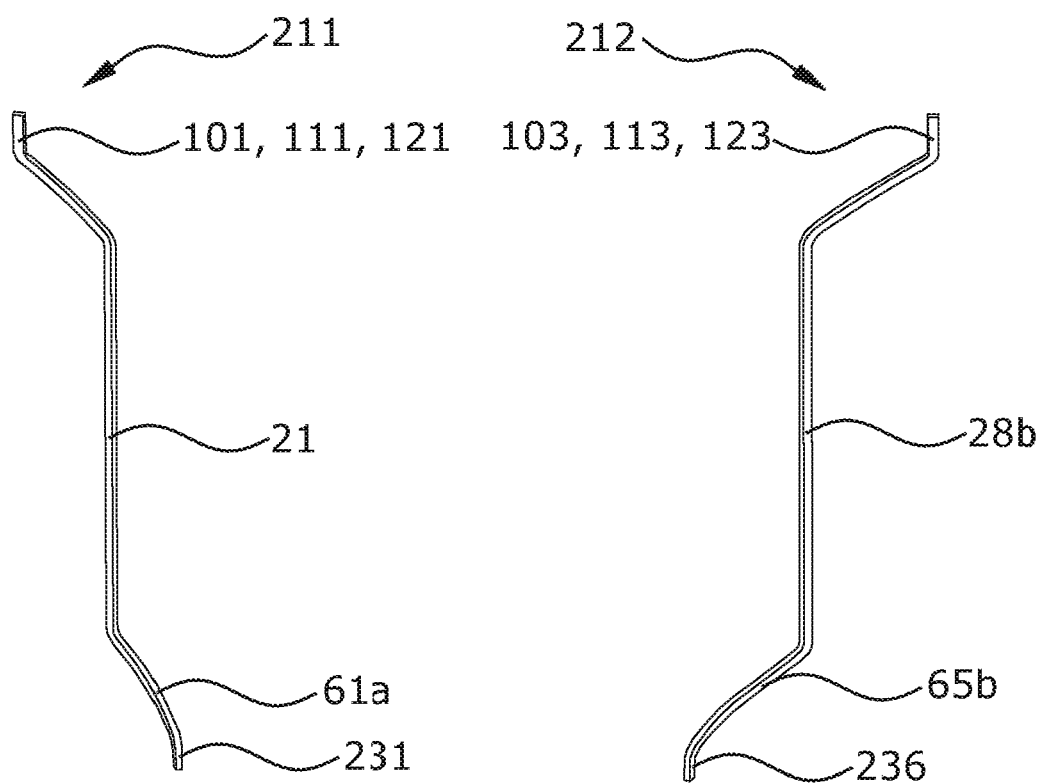
FIG. 17 shows two single pins.

FIG. 17 shows on the left a first single pin 211, also called an I pin. First end pin 21 is located in the center, which is arranged, for example, in first slot 51, layer L5 of the stator. The reference numerals are identical to the previous figures. First single pin 211 is depicted with first end face 7 upwards, when viewed from the stator center. At the lower end, first single pin 211 has a pin foot 61a with a first weld point 231. Input 101, 111, 121 is located at the upper end.

A second single pin 212 is shown to the right in FIG. 17. Sixth end pin 28b is located in the center, which is arranged, for example, in slot 86, layer L2 of the stator. The reference numerals are identical to the previous figures. The pins are depicted with first end face 7 upwards, when viewed from the stator center. At the lower end, second single pin 212 has a pin foot 65b with a sixth weld point 236. Output 103, 113, 123 is located at the upper end.

Figure 18:
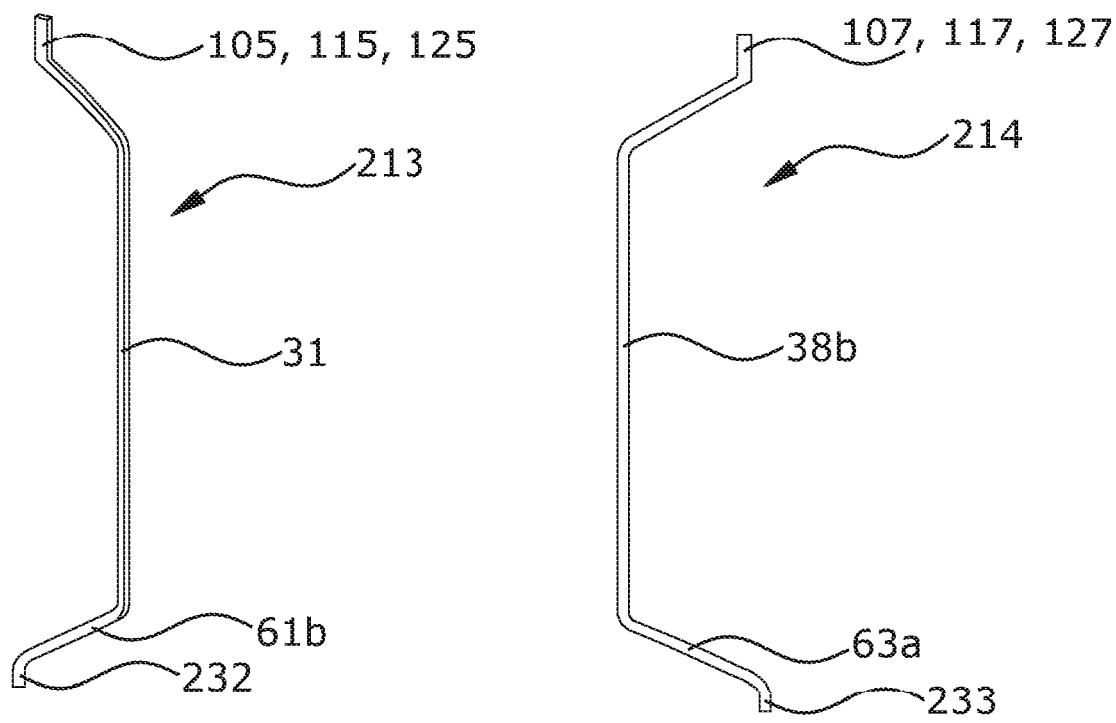
FIG. 18 shows two double pins.

FIG. 18 shows on the left a third single pin 213, also called an I pin. Seventh end pin 31 is located in the center, which is arranged, for example, in first slot 51, layer L6 of the stator. The reference numerals are identical to the previous figures. Single pin 213 is depicted with first end face 7 upwards, when viewed from the stator center. At the lower end, third single pin 213 has a pin foot 61b with a second weld point 232. Input 105, 115, 125 is located at the upper end.

A fourth single pin 214 is shown to the right in FIG. 18. Twelfth end pin 38b is located in the center, which is arranged, for example, in slot 86, layer L4 of the stator. The reference numerals are identical to the previous figures. The pins are depicted with first end face 7 upwards, when viewed from the stator center. At the lower end, fourth single pin 214 has a pin foot 63a with a third weld point 233. Output 107, 117, 127 is located at the upper end.

Figure 19:
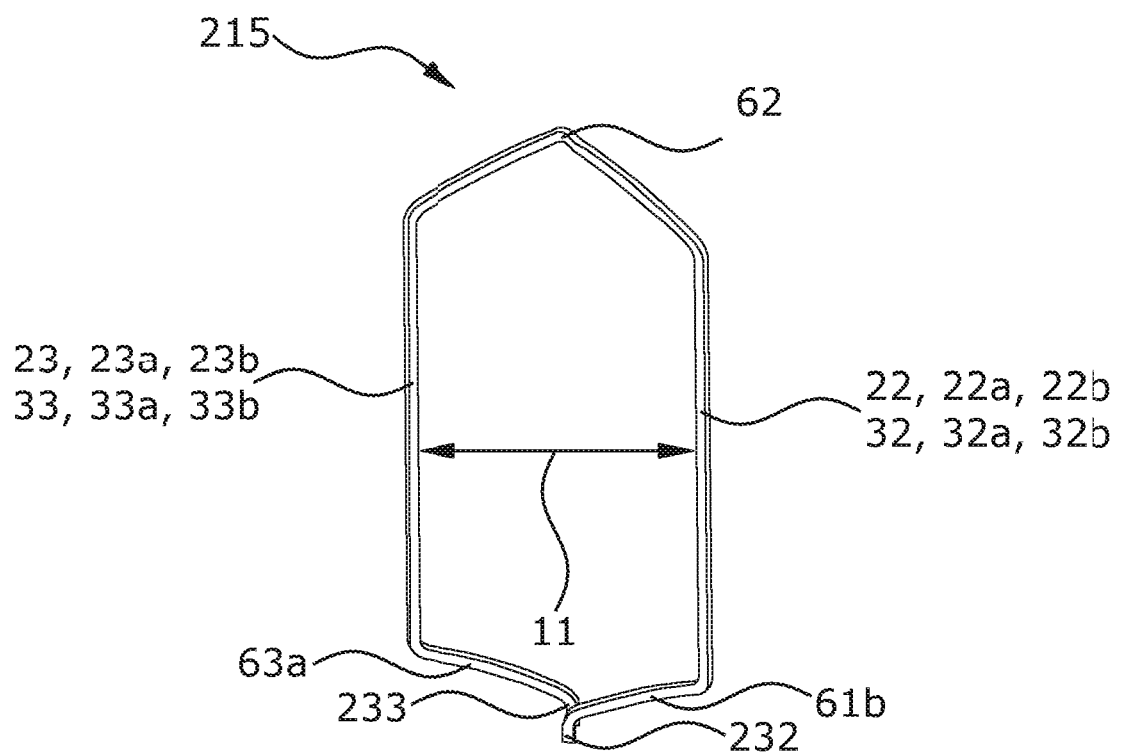
FIG. 19 shows a first double pin.

FIG. 19 shows a first double pin 215, or U pin, which establishes second connection type 62 between a second pin 22, 22a, 22b, 32, 32a, 32b and a third pin 23, 23a, 23b, 33, 33a, 33b. Double pin 215 may bridge first distance 11 between the slots. At the lower end, the double pin has two inwardly-bent pin feet 63a, 61b, with a third weld point 233 and a second weld point 232.

Figure 20:
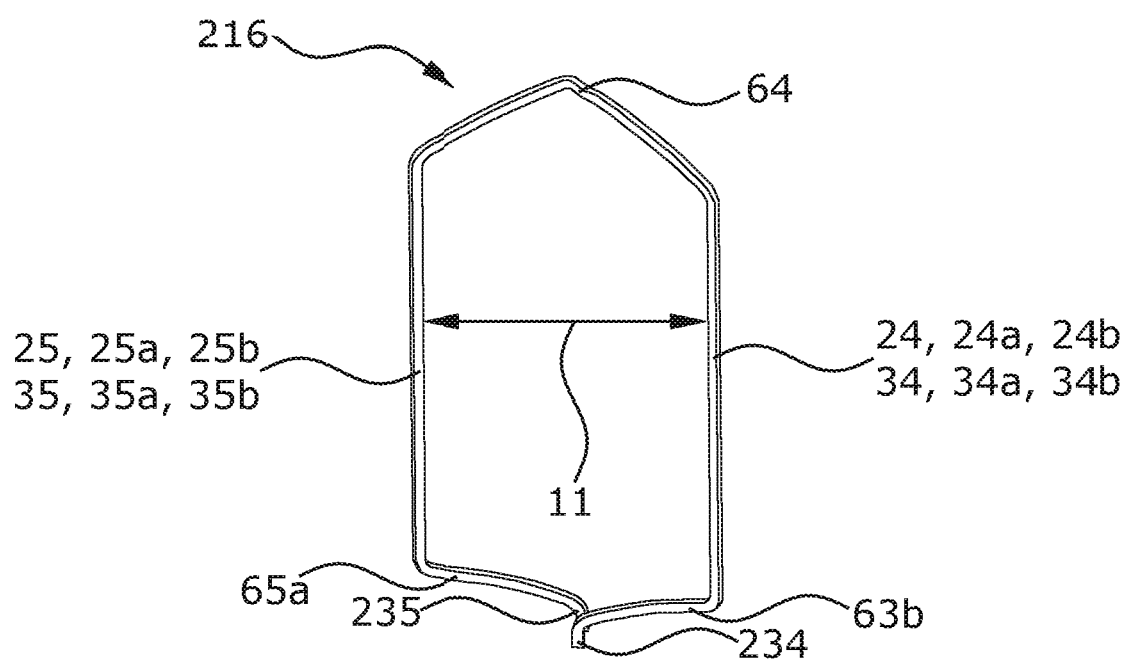
FIG. 20 shows a second double pin.

FIG. 20 shows a second double pin 216, or U pin, which establishes fourth connection type 64 between a fifth pin 25, 25a, 25b, 35, 35a, 35b and a fourth pin 24, 24a, 24b 34, 34a, 34b. Double pin 216 may bridge first distance 11 between the slots. At the lower end, the double pin has two inwardly-bent pin feet 65a, 63b, with a fifth weld point 235 and a fourth weld point 234.

Figure 21:
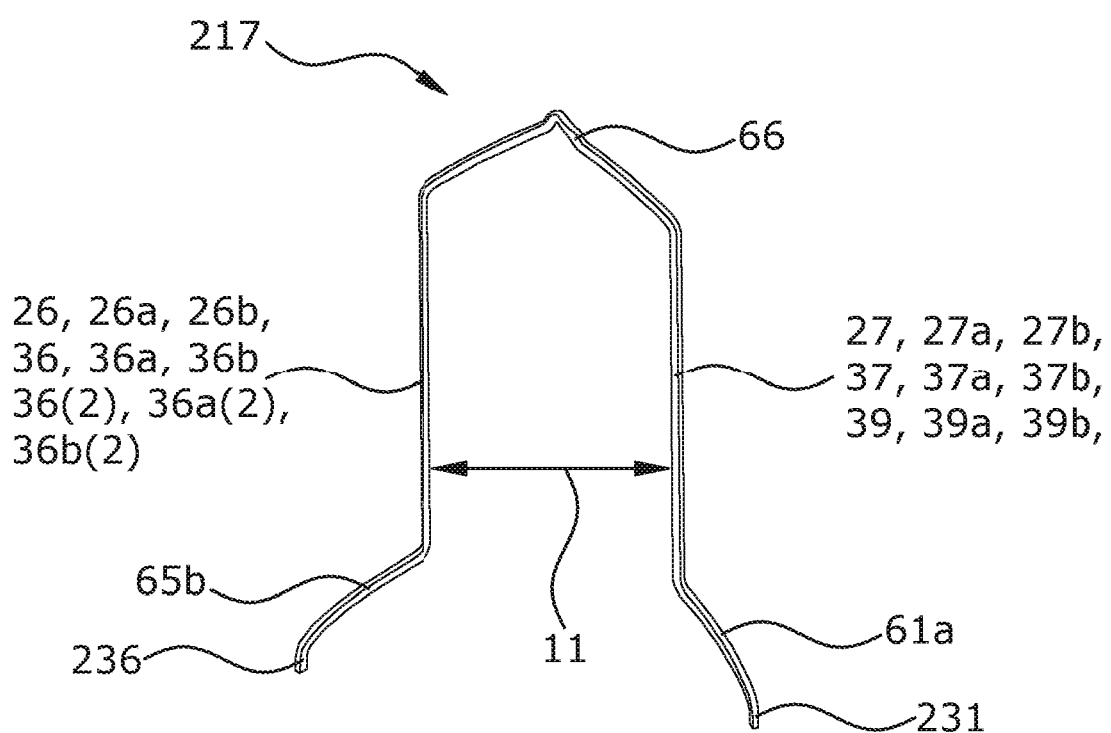
FIG. 21 shows a third double pin.

FIG. 21 shows a third double pin 217, or U pin, which establishes sixth connection type 66 between a sixth pin 26, 26a, 26b, 36, 36a, 36b, 36(2), 36a(2), 36b(2) and a seventh or ninth pin 27, 27a, 27b, 37, 37a, 37b, 39, 39a, 39b. Third double pin 217 may bridge first distance 11 between the slots. At the lower end, the double pin has two outwardly-bent pin feet 65b, 61a, with a sixth weld point 236 and a first weld point 231.

Distance 11 is identical only with respect to the number of slots to be bridged. The actual spatial distance to be bridged differs, because the double pins connect different layers.

Figure 22:
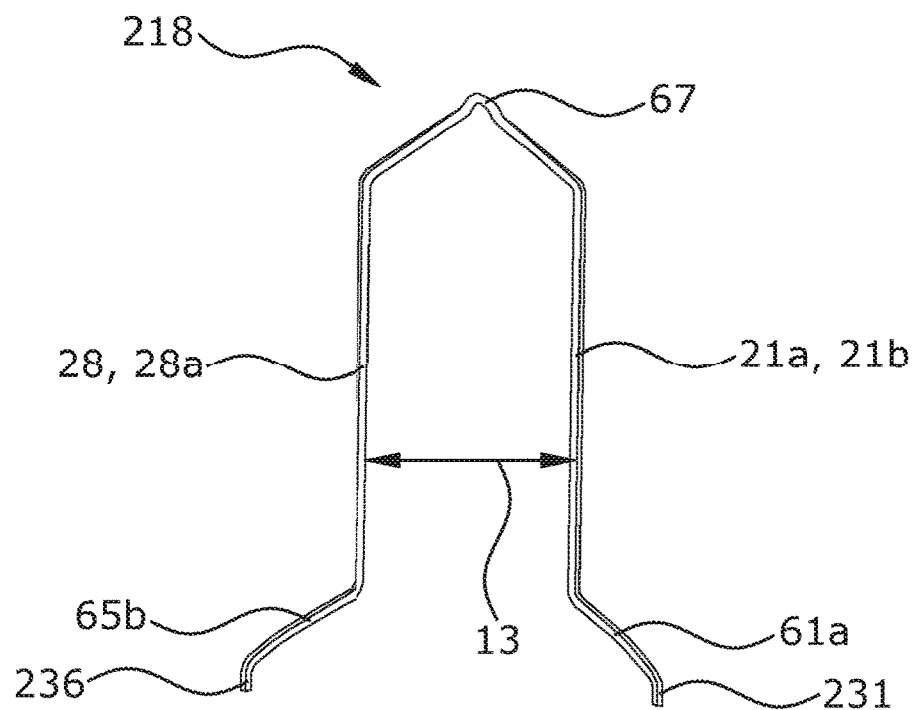
FIG. 22 shows a fourth double pin.

FIG. 22 shows a fourth double pin 218, or U pin, which establishes seventh connection type 67 between a second or fourth end pin 28, 28a and a third or fifth end pin 21a, 21b. Fourth double pin 218 may bridge second distance 13, thus is one slot smaller than first distance 11. At the lower end, fourth double pin 218 has two outwardly-bent pin feet 65b, 61a, with a sixth weld point 236 and a first weld point 231.

Figure 23:
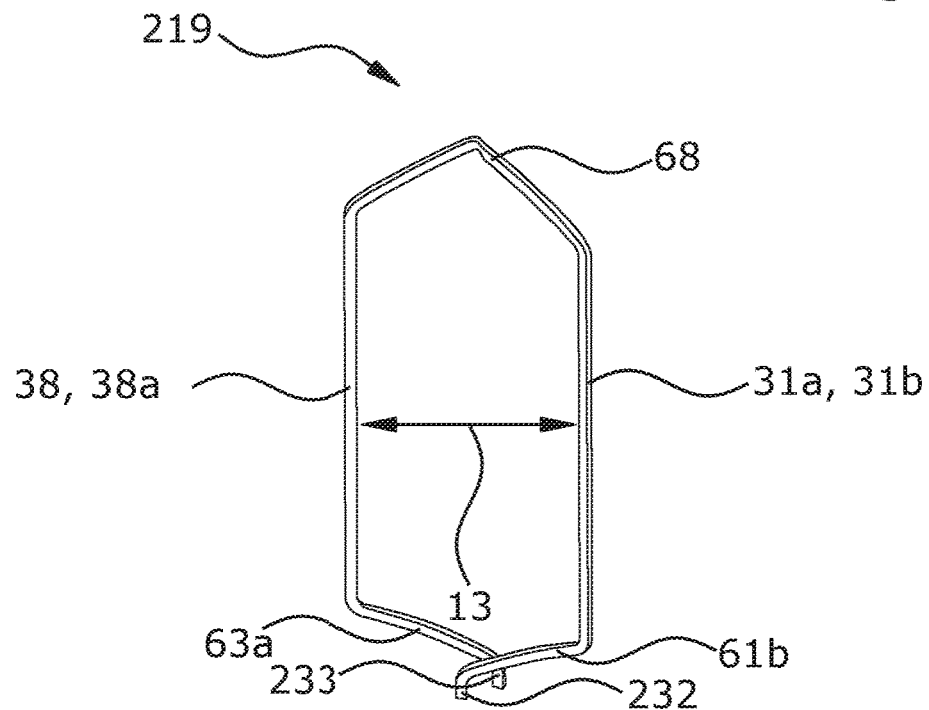
FIG. 23 shows a fifth double pin.

FIG. 23 shows a fifth double pin 219, or U pin, which establishes eighth connection type 68 between an eighth or tenth end pin 38, 38a and a ninth or eleventh end pin 31a, 31b. Fifth double pin 219 may bridge second distance 13, thus is one slot smaller than first distance 11. At the lower end, fifth double pin 219 has two inwardly-bent pin feet 63a, 61b, with a third weld point 233 and a second weld point 232.

The different single and double pins in FIGS. 17 to 23 have similar pin feet. First connection type 61 is formed by welding first weld point 231 on pin foot 61a to second weld point 232 on pin foot 61b according to the winding scheme. Third connection type 63 is formed by welding third weld point 233 on pin foot 63a to fourth weld point 234 on pin foot 63b according to the winding scheme. Fifth connection type 65 is formed by welding fifth weld point 235 on pin foot 65a to sixth weld point 236 on pin foot 65b according to the winding scheme. The single pins are also connected to the double pins via the respective connection type, so that the pins circulate the stator as continuous electrical conductors.

Figure 24:
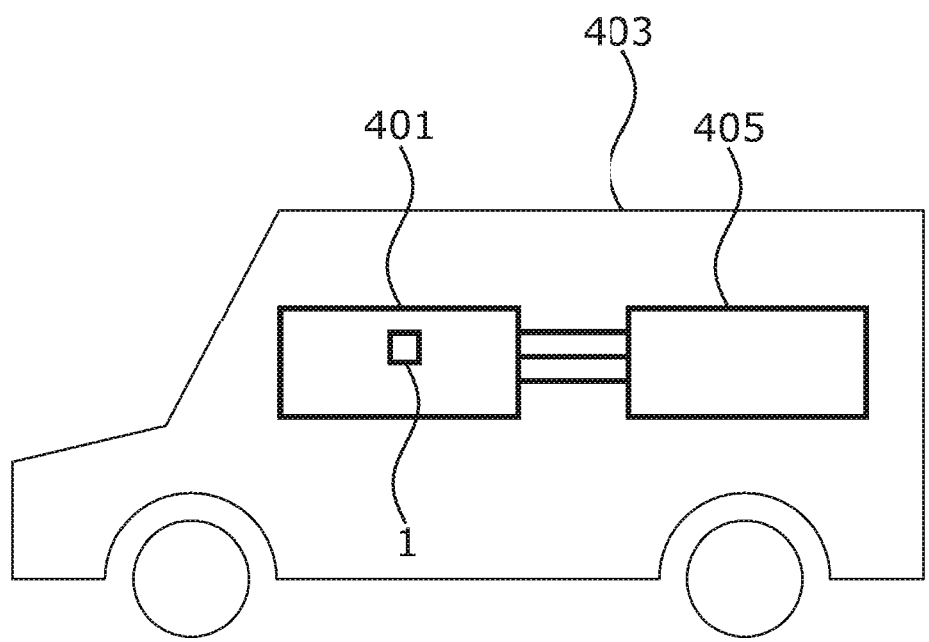
FIG. 24 shows a vehicle with an electric machine, in particular an electric motor with a stator.

FIG. 24 is a basic sketch of an exemplary embodiment of a vehicle 403, for example, a hybrid vehicle or an electric vehicle, comprising an electric machine 401, in particular an electric motor, with an exemplary embodiment of stator 1 for driving vehicle 403. Furthermore, vehicle 403 may have an inverter 405, which supplies electric machine 401 with an alternating current from a direct current source.

LIST OF REFERENCE NUMERALS

1 Stator
2, 3, 21-38b Pin 5, 51-58, 71-78 Slot
81-88, 91-96 Slot
7 First end face
9 Second end face
11 First distance
13 Second distance
15 Third distance
21 First end pin
28 Second end pin
21a Third end pin
28a Fourth end pin
21b Fifth end pin
28b Sixth end pin
31 Seventh end pin
38 Eighth end pin
31a Ninth end pin
38a Tenth end pin
31b Eleventh end pin
38b Twelfth end pin
41-46, 41a-46a, 41b-46b Winding
61 First connection type
62 Second connection type
63 Third connection type
64 Fourth connection type
65 Fifth connection type
66 Sixth connection type
67 Seventh connection type
68 Eighth connection type
61a, b, 63a, b, 65a, b Pin feet
101, 105, 111, 115, 121, 125 Input
103, 107, 113, 117, 123, 127 Output
211 First single pin
212 Second single pin
213 Third single pin
214 Fourth single pin
215 First double pin
216 Second double pin
217 Third double pin
218 Fourth double pin
219 Fifth double pin
231 First weld point
232 Second weld point
233 Third weld point
234 Fourth weld point
235 Fifth weld point
236 Sixth weld point
201 First coil
202 Second coil
401 Electric machine
403 Vehicle
405 Inverter
L1, L2, L3, L4, L5, L6 Layer
M Stator center

The invention claimed is:

1. A stator for an electric machine comprising:
a plurality of pins, which are arranged on concentric circles at different distances to a stator center in slots in the stator, the concentric circles forming different layers from outwards to inwards, the layers being numbered in an ascending order from an outside inward to the stator center; and
a winding,
wherein six pins are arranged in the different layers and are serially connected to one another to form the winding,
a first pin of the winding is located in a first slot in a 6n-1 layer, wherein n is an integer;
a second pin of the winding is located in a second slot in a 6n layer, wherein a second slot has a first circumferential distance to the first slot in a first circumferential direction of the stator;
a third pin of the winding is located in the first slot in a 6n-2 layer;
a fourth pin of the winding is located in the second slot in a 6n-3 layer;
a fifth pin of the winding is located in the first slot in a 6n-5 layer; and
a sixth pin of the winding is located in the second slot in a 6n-4 layer.

2. The stator according to claim 1, wherein the stator has a first end face and a second end face; and
the first pin and the second pin are connected to one another on the second end face by means of a first connection type;
the second pin and the third pin are connected to one another on the first end face by means of a second connection type;
the third pin and the fourth pin are connected to one another on the second end face by means of a third connection type;
the fourth pin and the fifth pin are connected to one another on the first end face by means of a fourth connection type;
the fifth pin and the sixth pin are connected to one another on the second end face by means of a fifth connection type;
wherein the first, second, third, fourth, and fifth connection types differ from one another.

3. The stator according to claim 2, wherein the second connection type comprises a first double pin, which is formed from the second pin and the third pin, wherein the first double pin has two inwardly-bent pin feet with weld points, and bridges first radial distance.

4. The stator according to claim 2, wherein the fourth connection type comprises a second double pin, which is formed from the fourth pin and the fifth pin wherein the second double pin has two inwardly-bent pin feet with weld points, and bridges first radial distance.

5. The stator according to claim 2, wherein the sixth connection type comprises a third double pin, which is formed from the sixth pin and a seventh or ninth pin, wherein the third double pin has two outwardly-bent pin feet with weld points, and bridges first radial distance.

6. The stator according to claim 2, wherein the first connection type is formed by a weld connection of a first weld point on a pin foot of a third double pin or of a fourth double pin or of a first single pin to a second weld point on a pin foot of a first double pin or of a fifth double pin or of a third single pin.

7. The stator according to claim 2, wherein the third connection type is formed by a weld connection of a third weld point on a pin foot of a first double pin or of a fifth double pin to a fourth weld point on a pin foot of a second double pin.

8. The stator according to claim 2, wherein the fifth connection type is formed by a weld connection of a fifth weld point on a pin foot of a second double pin to a sixth weld point on a pin foot of a third double pin or of a fourth double pin or of a second single pin.

9. The stator according to claim 1, wherein the stator has at least two windings and at least the sixth pin in the second slot is connected to a seventh pin in the 6n-1 layer in a third slot by means of a sixth connection type.

10. The stator according to claim 9, wherein a same first distance lies between the third slot and the second slot as lies between the second slot and the first slot.

11. The stator according to claim 9, wherein the stator has a plurality of windings, which extend across an entire circumference of the stator and thereby form a partial coil.

12. The stator according to claim 11, wherein one pin from three partial coils is connected to one another by means of a seventh connection type or an eighth connection type and forms a coil.

13. The stator according to claim 12, wherein inputs of end pins from two coils are connected to one another by means of a ninth connection type.

14. The stator according to claim 12, wherein the seventh connection type comprises a fourth double pin, which is formed from a second or fourth end pin and a third or fifth end pin, wherein the fourth double pin has two outwardly-bent pin feet with weld points, and bridges second radial distance.

15. The stator according to claim 12, wherein the eighth connection type comprises a fifth double pin, which is formed from an eighth or tenth end pin and a ninth or eleventh end pin, wherein the fifth double pin has two inwardly-bent pin feet with weld points in each case, and bridges second radial distance.

16. The stator according to claim 1, wherein a first single pin comprises a first end pin and has a pin foot bent in a clockwise direction with a weld point.

17. The stator according to claim 1, wherein a second single pin comprises a sixth end pin and has a pin foot bent in a counterclockwise direction with a weld point.

18. The stator according to claim 1, wherein a third single pin comprises a seventh end pin and has a pin foot bent in a counterclockwise direction with a weld point.

19. The stator according to claim 1, wherein a fourth single pin comprises a twelfth end pin and has a pin foot bent in a clockwise direction with a weld point.

20. A vehicle with an electric machine with the stator according to claim 1.

21. A stator for an electric machine comprising:
a plurality of pins, which are arranged on concentric circles at different distances to a stator center in slots in the stator, the concentric circles forming different layers from outwards to inwards; and
a winding,
wherein six pins are arranged in the different layers and are serially connected to one another to form the winding,
a first pin of the winding is located in a first slot in a 6n-1 layer, wherein n is an integer;
a second pin of the winding is located in a second slot in a 6n layer, wherein a second slot has a first circumferential distance to the first slot in a first circumferential direction of the stator;
a third pin of the winding is located in the first slot in a 6n-2 layer;
a fourth pin of the winding is located in the second slot in a 6n-3 layer;
a fifth pin of the winding is located in the first slot in a 6n-5 layer; and
a sixth pin of the winding is located in the second slot in a 6n-4 layer,
wherein the stator has at least two windings and at least the sixth pin in the second slot is connected to a seventh pin in the 6n-1 layer in a third slot by means of a sixth connection type,
wherein the stator has a plurality of windings, which extend across an entire circumference of the stator and thereby form a partial coil,
wherein one pin from three partial coils is connected to one another by means of a seventh connection type or an eighth connection type and forms a coil, and
wherein the partial coils form six coils, and these are assigned to three phases in such a way that in each case the pins from two coils, which are assigned to a same phase, and are located in three adjacent slots.

22. A stator for an electric machine comprising:
a plurality of pins, which are arranged on concentric circles at different distances to a stator center in slots in the stator, the concentric circles forming different layers from outwards to inwards; and
a winding,
wherein six pins are arranged in the different layers and are serially connected to one another to form the winding,
a first pin of the winding is located in a first slot in a 6n-1 layer, wherein n is an integer;
a second pin of the winding is located in a second slot in a 6n layer, wherein a second slot has a first circumferential distance to the first slot in a first circumferential direction of the stator;
a third pin of the winding is located in the first slot in a 6n-2 layer;
a fourth pin of the winding is located in the second slot in a 6n-3 layer;
a fifth pin of the winding is located in the first slot in a 6n-5 layer; and
a sixth pin of the winding is located in the second slot in a 6n-4 layer,
wherein the stator has at least two windings and at least the sixth pin in the second slot is connected to a seventh pin in the 6n-1 layer in a third slot by means of a sixth connection type,
wherein the stator has a plurality of windings, which extend across an entire circumference of the stator and thereby form a partial coil,
wherein one pin from three partial coils is connected to one another by means of a seventh connection type or an eighth connection type and forms a coil,
wherein inputs of end pins from two coils are connected to one another by means of a ninth connection type, and
wherein inputs of end pins of the two coils are connected to one another, and the two coils are thus switched in parallel, and, are assigned to one phase.

* * * * *